United States Patent
Van Thiel

(10) Patent No.: US 11,691,607 B2
(45) Date of Patent: Jul. 4, 2023

(54) ELECTROPNEUMATIC HAND BRAKE (EPH) HAVING INTEGRATED TCV (EUROPEAN AND SCANDINAVIAN CONTROL)

(71) Applicant: WABCO GmbH, Hannover (DE)

(72) Inventor: Julian Van Thiel, Grossburgwedel (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 299 days.

(21) Appl. No.: 16/494,327

(22) PCT Filed: Mar. 21, 2018

(86) PCT No.: PCT/EP2018/057119
§ 371 (c)(1),
(2) Date: Sep. 16, 2019

(87) PCT Pub. No.: WO2018/172394
PCT Pub. Date: Sep. 27, 2018

(65) Prior Publication Data
US 2020/0079341 A1 Mar. 12, 2020

(30) Foreign Application Priority Data

Mar. 21, 2017 (DE) .................... 10 2017 002 715.3
Jun. 24, 2017 (DE) .................... 10 2017 006 356.7

(51) Int. Cl.
*B60T 15/20* (2006.01)
*B60T 8/34* (2006.01)
(Continued)

(52) U.S. Cl.
CPC ............ *B60T 13/683* (2013.01); *B60T 8/342* (2013.01); *B60T 8/343* (2013.01); *B60T 8/3605* (2013.01);
(Continued)

(58) Field of Classification Search
CPC ...... B60T 13/385; B60T 13/58; B60T 13/683; B60T 8/342; B60T 8/343; B60T 8/3605; B60T 15/203; B60T 15/206
See application file for complete search history.

(56) References Cited

U.S. PATENT DOCUMENTS 5,090,780 A * 2/1992 Powell .................. B60T 13/665
    303/15
6,435,994 B1 * 8/2002 Friedmann ................ F16H 7/18
    474/111
(Continued)

FOREIGN PATENT DOCUMENTS

CN      102159435 A     8/2011
CN      105835859 A     8/2016
(Continued)

OTHER PUBLICATIONS

English Machine Translation for EP-2615003 which is an equivalent of DE-102012000435 (Year: 2013).*

*Primary Examiner* — Melody M Burch
(74) *Attorney, Agent, or Firm* — Leydig, Voit & Mayer, Ltd.

(57) ABSTRACT

An electropneumatic control module for an electronically controllable pneumatic brake system for a vehicle combination with a tractor vehicle and a trailer vehicle includes a pneumatic reservoir input, which is connectable to a compressed-air reservoir, and a trailer control unit, which has a trailer control valve unit with one or more electropneumatic valves, a trailer brake pressure port and a trailer supply pressure port. The electropneumatic control module further includes an immobilizing brake unit, which has a spring-type actuator port for at least one spring-type actuator for a tractor vehicle and an immobilizing brake valve unit with one or more electropneumatic valves, and an electronic control unit, wherein the electronic control unit is designed (Continued)

to, based on an electronic immobilizing signal, trigger the immobilizing brake valve unit to switch at least one valve of the immobilizing brake valve unit.

25 Claims, 11 Drawing Sheets

(51) Int. Cl.
  *B60T 13/68* (2006.01)
  *B60T 8/36* (2006.01)
  *B60T 13/38* (2006.01)
  *B60T 13/58* (2006.01)
  *B60T 7/08* (2006.01)
  *B60T 7/20* (2006.01)

(52) U.S. Cl.
  CPC ............ *B60T 13/385* (2013.01); *B60T 13/58* (2013.01); *B60T 15/203* (2013.01); *B60T 15/206* (2013.01); *B60T 7/085* (2013.01); *B60T 7/20* (2013.01); *B60T 2270/10* (2013.01); *B60T 2270/413* (2013.01); *B60T 2270/82* (2013.01)

(56) References Cited

U.S. PATENT DOCUMENTS

| | | | |
|---|---|---|---|
| 2004/0194832 A1* | 10/2004 | Kemer | B60T 17/085 137/596 |
| 2007/0027006 A1 | 2/2007 | Suiter | |
| 2008/0202871 A1* | 8/2008 | Battistella | B60T 15/041 188/170 |
| 2009/0184568 A1 | 7/2009 | Bensch et al. | |
| 2010/0187902 A1* | 7/2010 | Bensch | B60T 13/683 303/127 |
| 2010/0237690 A1 | 9/2010 | Foerster et al. | |
| 2011/0144855 A1 | 6/2011 | Herges et al. | |
| 2011/0187181 A1 | 8/2011 | Kaupert | |
| 2012/0001477 A1 | 1/2012 | Mederer | |
| 2013/0086898 A1* | 4/2013 | Yang | B60T 7/042 60/413 |
| 2013/0214588 A1* | 8/2013 | Kiel | B60T 13/68 137/625.2 |
| 2015/0239441 A1* | 8/2015 | Klostermann | B60T 15/028 303/7 |
| 2016/0082939 A1* | 3/2016 | Cole | B60T 15/021 303/8 |

FOREIGN PATENT DOCUMENTS

| | | |
|---|---|---|
| CN | 205417585 U | 8/2016 |
| DE | 102004051309 A1 | 5/2006 |
| DE | 102005060225 A1 | 6/2007 |
| DE | 102007038472 A1 | 2/2009 |
| DE | 102007047691 A1 | 4/2009 |
| DE | 102008009043 B3 | 5/2009 |
| DE | 102008014458 A1 | 9/2009 |
| DE | 102012000435 A1 | 7/2013 |
| DE | 102012105136 A1 | 12/2013 |
| DE | 102014108681 B3 | 4/2015 |
| DE | 102016003034 A1 | 9/2016 |
| DE | 102015112490 A1 | 2/2017 |
| EP | 2615003 A1 | 7/2013 |
| EP | 2821303 A1 | 1/2015 |
| WO | WO 2009152982 A2 | 12/2009 |
| WO | WO 2016169975 A1 | 10/2016 |
| WO | WO 2016177475 A1 | 11/2016 |

* cited by examiner

ELECTROPNEUMATIC HAND BRAKE (EPH) HAVING INTEGRATED TCV (EUROPEAN AND SCANDINAVIAN CONTROL)

CROSS REFERENCE TO RELATED APPLICATIONS

This application is a U.S. National Phase Application under 35 U.S.C. § 371 of International Application No. PCT/EP2018/057119, filed on Mar. 21, 2018, and claims benefit to German Patent Applications No. DE 10 2017 002 715.3, filed on Mar. 21, 2017, and No. DE 10 2017 006 356.7, filed on Jun. 24, 2017. The International Application was published in German on Sep. 27, 2018 as WO 2018/172394 under PCT Article 21(2).

FIELD

The invention relates to an electropneumatic control module for an electronically controllable pneumatic brake system for a vehicle with a tractor vehicle and a trailer vehicle, having a pneumatic reservoir input, which is connectable to a compressed-air reservoir, having a trailer control unit, which has a trailer control valve unit with one or more electropneumatic valves, a trailer brake pressure port and a trailer supply pressure port, having an immobilizing brake unit, which has a spring-type actuator port for a spring-type actuator for a tractor vehicle and an immobilizing brake valve unit with one or more electropneumatic valves, and having an electronic control unit, wherein the electronic control unit is designed to, on the basis of an electronic immobilizing signal, trigger the immobilizing brake valve unit to switch at least one valve of the immobilizing brake valve unit such that the spring-type actuator port is connected to a pressure sink for the purposes of ventilating the spring-type actuator. The invention furthermore relates to a tractor vehicle having an electropneumatic control module of the above type.

BACKGROUND

In vehicles, in particular utility vehicles, having a pneumatic brake system formed in particular as an electronic brake system (EBS) or anti-lock system (ABS), for the outputting of brake pressures, electropneumatic valves, for example electropneumatic switchover valves, for example 3/2 directional control valve or axle modulators, connected upstream of relay valves can be activated by a control unit (ECU), which electropneumatic valves then, in a manner dependent on a demanded vehicle target deceleration, pneumatically transmit a brake pressure to the brake cylinders of service brakes of the brake system.

In brake systems for a vehicle combination, the brake system has a trailer control unit, also referred to as Trailer Control Valve (TCV), which is provided for also providing a pneumatic output, correspondingly to the vehicle target decelerations predefined by the tractor vehicle, via ports, specifically a trailer brake pressure port and a trailer supply pressure port, which are also referred to as yellow and red coupling head. Via the trailer supply pressure port, the trailer vehicle is provided with a supply pressure from a reservoir, provided for that purpose, of the tractor vehicle, whereas the corresponding brake pressure is output via the trailer brake pressure port.

As a further component or module, brake systems of the above generic type have an immobilizing brake unit, also referred to as electropneumatic handbrake (EPH). Such immobilizing brake units are commonly operated with so-called spring-type actuators, that is to say brake devices which brake one or more axles of the tractor vehicle owing to a spring force. In the aerated state, the brakes are released, and in the ventilated state, they are braked. In an unpressurized state, the corresponding vehicle is thus braked. For the activation of the immobilizing brake unit, an electrical switch is generally provided in the driver's cab of the tractor vehicle, by means of which switch a corresponding signal can be output to an electronic control unit, which then switches one or more electropneumatic valves such that the spring-type actuators are either ventilated or aerated.

The immobilizing brake unit, that is to say the electropneumatic hand brake, is used for parking the vehicle combination, but also as an auxiliary brake in particular situations. That is to say, aside from the normal service brakes, the spring-type actuators are at least partially ventilated in order to use these additionally or alternatively for braking purposes. Thus, for example during purely service braking operations, braking is performed exclusively by means of spring-type actuators in the tractor vehicle and service brakes in the trailer vehicle. The service brakes in the tractor vehicle are not actuated during purely service braking operations. Alternatively, a redundancy mode may also be implemented, in which, for example in the event of a circuit failure at the rear axle, the spring-type actuators are used for assistance as an alternative to the service brakes. The front axle can continue to be braked by means of service brakes, and the trailer vehicle likewise by means of service brakes.

Here, to pneumatically output a corresponding brake signal for the trailer vehicle also, use is generally made of a so-called inverse relay valve which outputs a rising pressure on the basis of a falling pressure in the spring-type actuators. Such inverse relay valves are of complex construction and commonly have multiple control pistons which interact with one another by way of various control surfaces and various control chambers.

Furthermore, in brake systems of the type mentioned in the introduction, a distinction is made between so-called "European trailer control" and "Scandinavian trailer control". Whereas it is the case in "European trailer control" that, in the parked state of the vehicle combination, a positive brake pressure corresponding to the ventilated spring-type actuators is output at the trailer vehicle in order to additionally brake the latter, the opposite is the case in "Scandinavian trailer control": In the parked state of the vehicle combination, the service brakes of the trailer vehicle should be released. This means that, in the case of "European trailer control", it is necessary in the parked state of the vehicle combination, that is to say in the electrically deenergized state, for a positive brake pressure to be permanently output by means of the trailer control unit (TCV) to the service brakes of the trailer vehicle.

Since it is thus the case in practice that the trailer control unit (TCV) and the immobilizing brake unit (EPH) interact, an integration of these two modules has proven to be desirable. A first approach for the integration is disclosed for example in DE 10 2016 003 034 A1. Whereas the immobilizing brake unit (EPH) has previously commonly been integrated into a compressed-air treatment unit, DE 10 2016 003 034 A1 discloses integrating the immobilizing brake unit (EPH) into the trailer control unit (TCV). This supposedly promotes a particularly simple integration of the electropneumatic components into the vehicle. A corresponding situation supposedly applies if the control device is at least partially integrated in a trailer device of said type.

Similarly, DE 10 2008 014 458 A1 from this applicant also proposes an electropneumatic device, in particular an air treatment device, an axle modulator, a trailer control valve, a control device of an electronic brake system or a vehicle dynamics control device, and/or an electropneumatic device of the vehicle, in particular an air treatment device or an air suspension device with an immobilizing brake function integrated therein.

A practical embodiment for "Scandinavian trailer control" is disclosed in DE 10 2015 112 490 A1. Said document discloses an electropneumatic control module according to the preamble of claim 1. The control module disclosed in said document has a common control unit (ECU) both for an immobilizing brake unit (EPH) and for a trailer control unit (TCV). Specifically, DE 10 2015 112 490 A1 has disclosed an electropneumatic control device of an electropneumatic brake system of a tractor vehicle-trailer combination at least for controlling the immobilizing brake of the tractor vehicle-trailer combination and the auxiliary braking of the tractor vehicle-trailer combination and the service braking at least of the trailer, having at least one housing, in or on which the following is arranged: a) a pneumatic control input port for a control line which leads to a pneumatic channel of a service brake actuating device of the tractor vehicle, b) a pneumatic supply port for a supply line which leads to at least one compressed-air reservoir of the tractor vehicle, c) a pneumatic control output port for a service line which leads to a "brake" coupling head of the tractor vehicle, d) a pneumatic supply output port for a supply line which leads to a "reservoir" coupling head of the tractor vehicle, e) an immobilizing brake output port for a brake line which leads to a spring-type brake cylinder of the tractor vehicle, f) an electric immobilizing brake control port for a control line which leads to an electric immobilizing brake actuating device, g) an electric service brake control port for a signal line which leads to an electrical channel of the service brake actuating device, h) a first relay valve having a control input, a first working output and a supply input, wherein the first working output is connected to the immobilizing brake output port and the supply input is connected to the supply input port, i) an electronic control unit, j) a first electromagnetic inlet/outlet valve combination which is controlled by the electronic control unit and which shuts off the control input of the first relay valve, connects said control input to a compressed-air sink or connects said control input to the pneumatic supply port, k) a second relay valve having a pneumatic supply input, which is connected to the supply input port, a pneumatic supply output, which is connected to the supply output port, a second working output, which is connected to the control output port and having a first pneumatic control input and a second pneumatic control input, l) an electromagnetic valve device which is controlled by the electronic control unit and which has a second electromagnetic inlet/outlet valve combination and an electromagnetic backup valve, wherein the backup valve, in the electrically deenergized state, connects the control input port to the first pneumatic control input of the second relay valve and, when electrically energized, shuts off said connection, and wherein the second electromagnetic inlet/outlet valve combination shuts off a second pneumatic control input of the second relay valve, connects said second pneumatic control input to a compressed-air sink or connects said second pneumatic control input to the pneumatic supply input port, wherein m) the second relay valve comprises two control pistons, a first control piston which delimits a first control chamber connected to the first pneumatic control input, and a second control piston which delimits a second control chamber connected to the second pneumatic control input, wherein the first control piston and the second control piston interact with a double-seat valve which has an inlet valve and an outlet valve for the aeration or ventilation of the second working output. By means of an electromagnetic valve device, the two control pistons of the second relay valve can be controlled such that, firstly, by means of the first control piston, service braking of the trailer and auxiliary braking is performed, if the spring-type actuators of the tractor vehicle are used for braking. The second control piston is used for a redundancy situation, if the vehicle driver outputs a redundancy pressure manually by means of a brake pedal. "European trailer control" such that the trailer is permanently braked by means of a brake pressure by means of the service brakes in the electrically deenergized state of the vehicle with ventilated spring-type actuators is not possible, and is explicitly not provided for, in the configuration from DE 10 2015 112 490 A1. Furthermore, the construction of the relay valve with two control pistons in one relay valve is complex.

Furthermore, DE 10 2012 000 435 A1 from this applicant has disclosed an immobilizing brake module for "European trailer control". The module disclosed in said document utilizes a relay valve and a first and a second bistable valve in order to be able to output the corresponding brake pressure for the service brakes of the trailer even in the electrically deenergized state with ventilated spring-type actuators.

Furthermore, DE 10 2004 051 309 B4 has disclosed an electropneumatic central unit of the utility vehicle constructed from modules with electrical and/or pneumatic components. The central unit may be assembled from individual modules in order to realize corresponding functionalities. The individual modules have electrical connections and pneumatic ports which correspond to one another.

DE 10 2007 047 691 A1 discloses an immobilizing brake modulator, by means of which service braking of the trailer can be activated in correspondence with spring-type actuators of the tractor vehicle. The immobilizing brake modulator has a tractor vehicle protection valve which is designed such that, in the event of a pressure drop of the reservoir pressure for the trailer, the control pressure line is also shut off.

SUMMARY

In an embodiment, the present invention provides an electropneumatic control module for an electronically controllable pneumatic brake system for a vehicle combination with a tractor vehicle and a trailer vehicle. The electropneumatic control module includes a pneumatic reservoir input, which is connectable to a compressed-air reservoir, and a trailer control unit, which has a trailer control valve unit with one or more electropneumatic valves, a trailer brake pressure port and a trailer supply pressure port. The electropneumatic control module further includes an immobilizing brake unit, which has a spring-type actuator port for at least one spring-type actuator for a tractor vehicle and an immobilizing brake valve unit with one or more electropneumatic valves, and an electronic control unit, wherein the electronic control unit is designed to, based on an electronic immobilizing signal, trigger the immobilizing brake valve unit to switch at least one valve of the immobilizing brake valve unit such that the spring-type actuator port is connected to a pressure sink for the purposes of ventilating the spring-type actuator. In addition, the electropneumatic control module includes a parking brake valve unit, having a pneumatically controlled switching valve which has a pneumatic control input for receiving a pneumatic control pressure, wherein, when the spring-type actuator port is connected to the pressure sink, the pneumatically controlled switching valve is switched such that a brake pressure can be output at the trailer brake pressure port.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
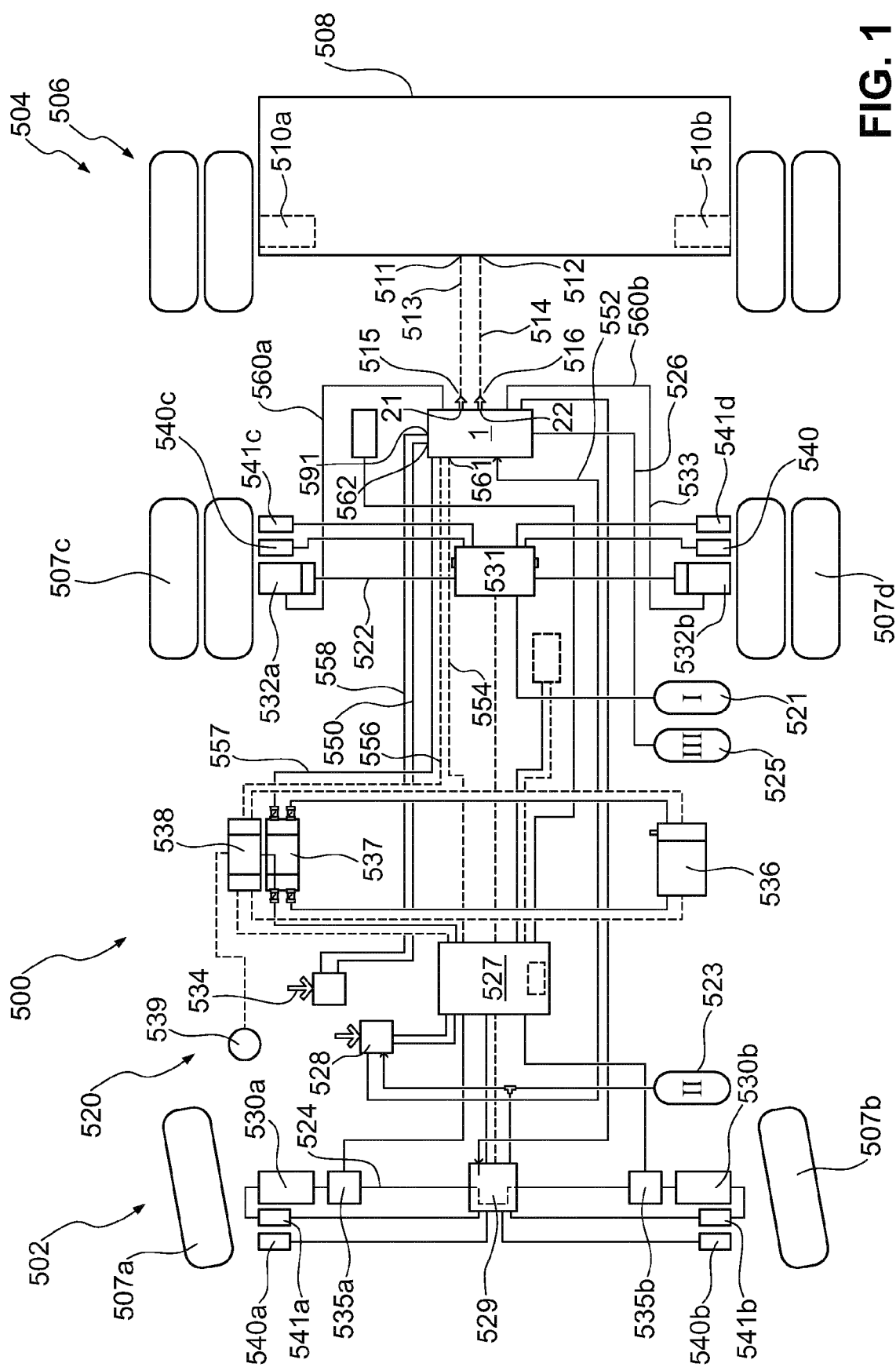
FIG. 1 shows a schematic overall layout of a brake system for a vehicle combination with an electropneumatic control module according to an embodiment of the invention.

Embodiments of the invention specify an electropneumatic control module and a tractor vehicle having such an electropneumatic control module of the type mentioned in the introduction which has a simplified construction, is in particular easily retrofittable, and permits "European trailer control".

Embodiments of the invention provide electropneumatic control modules of the type mentioned in the introduction by means of a parking brake valve unit, having a pneumatically controlled switching valve which has a pneumatic control input for receiving a pneumatic control pressure, wherein, when the spring-type actuator port is connected to the pressure sink, the pneumatically controlled switching valve is switched such that a brake pressure can be output at the trailer brake pressure port.

Through the use of the pneumatically controlled switching valve, a simple construction is firstly realized, which makes it possible to dispense with an inverse relay valve, and secondly, the outputting of a brake pressure at the trailer brake pressure port is achieved in the situation in which the spring-type actuators have been ventilated. With this solution, it is thus possible firstly to dispense with the inverse relay valve, and secondly to achieve reliable trailer braking in accordance with "European trailer control". Also, no further electropneumatic valve, as has been utilized in some cases in the prior art, is required for this purpose. A pneumatically controlled switching valve has the advantage that it can also be switched without electrical energization, owing to the pneumatic pressure alone. A pneumatically controlled switching valve according to the invention has a first and a second switching position, wherein, in the second switching position, said switching valve is switched such that a brake pressure is output at the trailer brake pressure port and, in the second switching position, no brake pressure is output at the trailer brake pressure port. The pneumatically controlled switching valve is preferably preloaded into the first switching position when electrically deenergized, in particular in spring-loaded fashion. This means that no brake pressure is output at the trailer brake pressure port only in the presence of a corresponding pneumatic pressure at the control input.

Accordingly, the pneumatic control pressure is, in a first embodiment, the pressure at the spring-type actuator port. Thus, for as long as the spring-type actuators are released and the cylinders of the spring-type actuators are aerated, the pneumatically controlled switching valve is in the second switching position, and if the spring-type actuator port is connected to a pressure sink and the spring-type actuators are ventilated, the pneumatically controlled switching valve is moved into the second switching position owing to the spring loading.

Alternatively, in a further embodiment, it is possible for the pneumatic control pressure to be an immobilizing brake control pressure in an upstream pilot-control unit of the immobilizing brake unit. Use can thus likewise be made of a pressure corresponding or equivalent to the pressure at the spring-type actuator port, such as in particular a control pressure for the immobilizing brakes. For example, it is possible to use the control pressure at a relay valve of the immobilizing brake unit (EPH). It is thus possible to use both the working pressure that actually prevails at the spring-type actuator as control pressure for the pneumatically controlled switching valve, and a control pressure that outputs the working pressure of the spring-type actuators.

In a further preferred embodiment, the electropneumatic control module has a redundancy pressure port with a first redundancy pressure line for the connection of a brake transducer or of the brake or control pressure of one of the other vehicle axles, via which redundancy pressure port, for example by means of actuation of a brake pedal, a pneumatic brake pressure can be output at the trailer brake pressure port. The brake transducer may be of purely pneumatic, electropneumatic or other form. The redundancy pressure port serves for receiving a vehicle target deceleration of a vehicle driver, who inputs this manually by means of the brake transducer. The vehicle driver can thus, in a fault situation, for example in the event of failure of the supply voltage, output a brake pressure purely pneumatically. Alternatively, a brake or control pressure of another vehicle axle, for example of the front axle, is output at the redundancy port. In this way, it is then possible in the fault situation for the trailer vehicle to be braked correspondingly to the other axle.

In a preferred embodiment, provision is made for the pneumatically controlled switching valve to be connected by means of an outlet to a second redundancy pressure line, to which the first redundancy pressure line is also connectable such that, when the pneumatically controlled switching valve is switched, a pressure can be output into the second redundancy pressure line. It is preferably consequently possible for a pneumatic brake pressure to be output to the trailer brake pressure port by switching the pneumatically controlled switching valve. In the redundancy pressure line, there is preferably arranged a redundancy valve, which may be formed for example as a 2/2 directional valve. The redundancy valve is used to lock out the redundancy pressure during normal driving operation. As a result of the linking of the pneumatically controlled switching valve by means of an outlet to a second redundancy pressure line, the redundancy valve can be used to lock out the pressure output by the pneumatically controlled switching valve and to thus implement a "trailer monitoring position", as will be described in more detail further below. Furthermore, in this way, the design and the layout are further simplified, because only one line, specifically the second redundancy pressure line, is used to output both the redundancy pressure and the pressure from the pneumatically controlled switching valve (parking brake pressure). It has been found that this is possible because the redundancy pressure is output only when the vehicle is in operation, whereas the parking brake pressure is output only when the vehicle is parked. In this way, components are saved, and the construction can be made more compact.

It is furthermore preferable if the pneumatically controlled switching valve is formed as a 3/2 directional valve with a first, a second and a third port. The third port is preferably, as described above, connected to the second redundancy pressure line and formed as an outlet.

In a preferred variant, the first port of the 3/2 directional valve is connected to the redundancy pressure port, and the second port of the 3/2 directional valve is connected to the reservoir input. Thus, in this variant, the 3/2 directional valve switches back and forth between the redundancy pressure port and the reservoir input in a manner dependent on the pneumatic control pressure at the control input, and outputs said pressure into the second redundancy pressure line. The first port of the 3/2 directional valve is preferably connected via the first redundancy pressure line to the redundancy pressure port. Consequently, if the spring-type actuators are ventilated, the 3/2 directional valve switches, owing to the falling control pressure at the control input, to the first switching position, such that the reservoir input is connected to the second redundancy pressure line. In the case of the spring-type actuators being ventilated, the outputting of a manually input redundancy pressure is thus not possible; the redundancy pressure port is connected to the first port of the 3/2 directional valve, which is shut off in this switching state.

In a second variant, the first port of the pneumatically controlled 3/2 directional valve is connected to a pressure sink. In this variant, the 3/2 directional valve switches back and forth between the reservoir input and the pressure sink, such that the second redundancy pressure line, which is connected to the third port of the pneumatically controlled 3/2 directional valve, can be ventilated when the 3/2 directional valve is in a corresponding switching position. In this variant, the redundancy port can be connected by means of a second valve, for example a 2/2 directional valve, to the second redundancy pressure line.

It is particularly preferable if the third port of the pneumatically controlled 3/2 directional valve is connected to a first input of a shuttle valve, a second input of the shuttle valve is connected to the redundancy pressure port, and an output of the shuttle valve is connected to the second redundancy pressure line. The shuttle valve is preferably formed as a so-called select-high valve with a double-acting check valve. This means that always the higher pressure prevailing at the first and second inputs is output at the outlet. In this variant, it is possible, despite an engaged or partially engaged parking brake, if this is used for example as an auxiliary brake, to manually output a redundancy pressure and, by means of the shuttle valve, to override the pressure that is output by the pneumatically controlled 3/2 directional valve. In this way, it is possible to dispense with a further 2/2 directional valve or another layout. A shuttle valve is a relatively small component, which is preferably integrated with the 3/2 directional valve.

In a preferred refinement, provision is made for an electronic switching valve to be arranged between an outlet of the pneumatically controlled switching valve and the trailer brake pressure port, such that, when the spring-type actuator port is connected to the pressure sink, an outputting of a brake pressure at the trailer brake pressure port can be prevented. The electronic switching valve is preferably formed as a 3/2 directional valve or 2/2 directional valve. It is preferably open in an electrically deenergized position. By means of the electronic switching valve, the outlet of the pneumatically controlled switching valve can be shut off. If the outlet is shut off, no brake pressure is output at the trailer brake pressure port. The outlet of the pneumatically controlled switching valve is preferably the third port of the pneumatically controlled 3/2 directional valve, if the pneumatically controlled switching valve is formed as a 3/2 directional valve.

The above variant is particularly preferable if the implementation of a so-called "trailer monitoring position" is desired. A trailer monitoring position serves for checking whether the vehicle combination is held stationary by means of the spring-type actuators in the tractor vehicle alone even without engaged service brakes in the trailer vehicle. For example, if the vehicle combination is parked at a location with a slight gradient, the driver should be able to engage a trailer monitoring position in order to check this. This serves for its safety if, owing to a leak, the brake force of the service brakes decreases over time if the vehicle combination is parked for a relatively long period of time. For the engagement of the "trailer monitoring position", the driver preferably actuates a corresponding switch, which, by means of the control unit (ECU), causes the electronic switching valve to switch and shut off the outlet of the pneumatically controlled switching valve. After a predetermined time, upon switching-off of the ignition and/or as a result of a corresponding actuation of the described switch, the electronic switching valve is enabled again and switched into the open position, preferably without electrical energization, such that, then, a brake pressure is output at the trailer brake pressure port, which brake pressure can be used for engaging the service brakes of the trailer.

One preferred refinement provides for the trailer control valve to have a relay valve, which has an input connected to the reservoir input, an output connected to the trailer brake pressure port, a ventilation output, via which the output is connectable to a pressure sink, and a control input, which opens into a common control chamber, wherein the control input is connectable via the trailer control valve unit to the reservoir input and/or to a pressure sink in order to output a brake pressure at the trailer brake pressure port, wherein both a service brake control pressure and a redundancy pressure can be output into the common control chamber. For this purpose, the trailer control valve unit preferably has an input valve and an outlet valve, wherein the control input is connectable by means of the inlet valve to the reservoir input and is connectable by means of the outlet valve to the pressure sink. The inlet and outlet valves may each be formed as a 2/2 directional valve, or are jointly integrated as a 3/2 directional valve. By means of this construction, a particularly simple relay valve is used, which has only a single control chamber. Provision may be made for multiple inputs to open into said control chamber. It is however preferable for only a single control input to be provided.

The relay valve preferably has only a single control chamber. The common control chamber of the relay valve is preferably delimited by a single control piston. The relay valve preferably also has only a single control piston. In this way, the construction is further simplified, and costs are reduced.

In a preferred refinement, the control chamber is connectable by means of an electronically switchable inlet valve to the reservoir input. The control chamber is preferably connectable to the second redundancy pressure line. For this purpose, it is possible for a further valve, for example an electronically switchable 2/2 directional valve, to be provided. Variants however also comprise a simple T-piece, a second control input which opens into the same control chamber, a 3/2 directional valve, or a select-high valve.

In a further preferred embodiment, the electronic control unit ECU is designed to (1.), on the basis of a first electronic auxiliary brake signal, trigger the immobilizing brake valve unit to switch at least one valve of the immobilizing brake valve unit such that a working pressure for the temporary and stepped ventilation of the at least one spring-type actuator is output at the spring-type actuator port; and (2.), on the basis of the first electronic auxiliary brake signal or a second auxiliary brake signal, trigger the trailer control valve unit to switch at least one valve of the trailer control valve unit such that a brake pressure is output at the trailer brake pressure port. If the spring-type actuators, which serve primarily as immobilizing brakes or parking brakes, are also to be used for auxiliary braking during travel, one or more valves of the immobilizing brake valve unit are switched by the electronic control unit on the basis of a received or determined first electronic auxiliary brake signal such that the spring-type actuators are correspondingly partially ventilated. In order, in this situation, to also actuate the service brakes of the trailer vehicle, the electronic control unit is preferably likewise configured to, on the basis of the first electronic auxiliary brake signal or a second auxiliary brake signal, if a second auxiliary brake signal which is provided for trailer vehicles is received or determined, trigger at least one valve of the trailer control valve unit to switch such that a brake pressure is output at the trailer brake pressure port. The brake pressure output at the trailer brake pressure port is preferably equivalent to the ventilation of the spring-type actuators, such that the tractor vehicle and the trailer vehicle are braked correspondingly. In this variant, an auxiliary brake functionality is implemented, whereby the vehicle combination is made safer.

The first electronic auxiliary brake signal and preferably the second electronic auxiliary brake signal, in the event that a second electronic auxiliary brake signal exists, is preferably provided either by an operator control element (for example manual brake switch), by a central unit or by a superordinate control unit (for example a control unit for autonomous driving). This first electronic auxiliary brake signal is transmitted for example via a CAN bus or LIN bus.

In a further preferred embodiment, the electronic control unit, the trailer control unit and the immobilizing brake unit are integrated in one module. In this context, "integrated in one module" is also to be understood to mean a situation in which the individual components, that is to say the electronic control unit, the trailer control unit and/or the immobilizing brake unit are formed as sub-modules which are flange-mounted onto one another. These components, specifically at least the electronic control unit, the trailer control unit and the immobilizing brake unit, are preferably arranged in a common housing. In this way, in particular, the assembly and also the retroactive installation of an electropneumatic control module according to the invention are greatly simplified. The control unit serves for controlling both the trailer control unit and the immobilizing brake unit and is locally integrated with these in one housing. For this purpose, it is then merely necessary, instead of separate analog pilot-control lines, which lead directly from the central module to the trailer control valve unit, for one electrical connection, for example one CAN bus connection, to be provided on the housing, along with the corresponding pneumatic ports. In this way, the susceptibility to faults is greatly reduced, because external interfaces are reduced.

It is preferable if not an inverse relay valve but a "normal" relay valve is provided in the electropneumatic control module. The pneumatically controlled switching valve is provided instead of the inverse part of the relay valve. Through the omission of the inverse relay valve, the installation space of the electropneumatic control module as a whole is reduced, and the complexity of the relay valve also decreases, whereby costs are reduced, and the susceptibility to faults is also lower. Furthermore, a further electropneumatic valve in the immobilizing brake unit (EPH), such as has been used in the prior art for the "trailer monitoring position", can be omitted.

In a further preferred embodiment, the electropneumatic control module has a connection for receiving a redundant electronic service brake signal, wherein the electropneumatic control module is designed to switch at least one valve of the trailer control valve unit in a manner dependent on the received redundant electronic service brake signal such that a corresponding brake pressure is output at the trailer brake pressure port. The redundant electronic brake signal is provided for example by a manually actuated brake transducer. During normal operation, an electronic brake signal is provided by a further control unit, for example a central module. If said further control unit fails, the electropneumatic control module according to this embodiment is configured to receive and use a redundant electronic brake signal. The brake transducer may be formed for example as a brake pedal which operates electromechanically and in the case of which a travel transducer provides a corresponding electrical signal on the basis of the pedal travel.

Here, provision is preferably made for the electropneumatic control module to have a redundant pressure sensor which is arranged on the first redundancy pressure line or at the redundancy pressure port and which is designed to detect the pneumatic redundancy pressure at the redundancy pressure port or in the first redundancy pressure line and to provide a corresponding redundancy pressure signal as a redundant electronic service brake signal to the control unit. The redundancy pressure signal provided by the redundant pressure sensor represents a driver demand, because the pressure sensor directly or indirectly detects the redundancy pressure output manually by means of the brake transducer.

The control unit is preferably designed to compare the redundant electronic service brake signal, received from the pressure sensor, with a service brake signal received from the central module or a further control unit. If the redundant electronic service brake signal represents a greater deceleration demand than the service brake signal received from the central module, the control unit triggers the switching of at least one valve of the trailer control valve unit in order to permit the outputting of a brake pressure at the trailer brake pressure port on the basis of the redundancy pressure. In other words, if the driver demands a more intense deceleration than the central module or the further control unit, the central module or the further control unit is locked out, and the driver takes over manually.

In an above-described variant in which the first port of the 3/2 directional valve is connected to the redundancy pressure port and the second port of the 3/2 directional valve is connected to the reservoir input, a configuration unit is preferably provided by means of which the electropneumatic control module can be configured between a European trailer configuration and a Scandinavian trailer configuration.

In the above-described variant in which the first port of the 3/2 directional valve is connected to the redundancy pressure port and the second port of the 3/2 directional valve is connected to the reservoir input, the electropneumatic control module is basically configured in the European trailer configuration. That is to say, in a state in which the spring-type actuators are applied, that is to say the spring-type actuator port is ventilated, a brake pressure is output at the trailer brake pressure port in order to apply the brakes of the trailer in correspondence with the spring-type actuators of the tractor vehicle. It is the intention for this not to be the case in the Scandinavian trailer configuration.

In order to be able to easily reconfigure an electropneumatic control module of the present invention between the two configurations, the European trailer configuration and the Scandinavian trailer configuration, without carrying out a complete redevelopment, the configuration unit is provided in this embodiment.

In a first variant, the configuration unit has a pressure distributor plate which is displaceable or movable in order to be able to switch back and forth between the stated configurations. Said pressure distributor plate may be installed at the factory. Provision may also be made for said pressure distributor plate not to be displaceable but rather to be installed in one-off fashion, but for ports to be interconnected such that, on the one hand, a European trailer configuration and, on the other hand, a Scandinavian trailer configuration can be realized.

In a further variant, the configuration unit has a switching slide valve, which can switch back and forth between the stated configurations. Such a switching slide valve may preferably be formed as a push-pull valve.

In a further variant, an adjusting screw is provided which has corresponding passages in order to connect pneumatic ports such that, on the one hand, a European trailer configuration and, on the other hand, a Scandinavian trailer configuration can be realized.

Specifically, the configuration unit is preferably connected between the reservoir input, the redundancy pressure port and the pneumatically controlled 3/2 directional valve. Here, the configuration unit preferably has a first configuration port, which is connected to the reservoir input, a second configuration port, which is connected to the redundancy pressure port, and a third configuration port, which is connected to the second port of the pneumatically controlled 3/2 directional valve.

In the European trailer configuration, the first configuration port is preferably connected to the third configuration port, such that ultimately the second port of the pneumatically controlled 3/2 directional valve is connected to the reservoir input. This corresponds to the abovementioned basic configuration. The third configuration port is closed.

By contrast, in the Scandinavian trailer configuration, the second configuration port is preferably connected to the third configuration port, whereas the first configuration port is closed. That is to say, the redundancy pressure is output at the second port of the pneumatically controlled 3/2 directional valve. The redundancy pressure is thus output both at the first and at the second port of the pneumatically controlled 3/2 directional valve, such that said redundancy pressure is output into the second redundancy pressure line independently of the switching of the pneumatically controlled 3/2 directional valve. Although the pneumatically controlled 3/2 directional valve is thus ultimately rendered ineffective, it allows the same basic layout of the electropneumatic control module to be used both for the European and for the Scandinavian trailer control. It is merely necessary to implement a different configuration in the configuration unit, such that switching can be performed between the connection of the configuration ports. According to a second aspect of the invention, a tractor vehicle which has an electropneumatic control module according to one of the above-described electropneumatic control modules. With regard to the refinements of the exemplary embodiments and the advantages thereof, reference is made to the above description in its entirety.

FIG. 1 firstly illustrates the overall construction on the basis of a vehicle combination 500, which comprises a tractor vehicle 502 and a trailer vehicle 504. The trailer vehicle 504 is shown here only schematically, specifically only one axle 506 of the trailer vehicle 504. The trailer vehicle 504 has a trailer service brake system 508 (illustrated only schematically) which is connectable by means of corresponding ports 511, 512 and pneumatic lines 513, 514 to corresponding ports 515, 516 on the tractor vehicle 502. By means of the port 515, the trailer vehicle 504 is connectable to a reservoir 525, and a brake pressure is transmitted via the port 516. The trailer service brake system 508 has schematically illustrated service brakes 510a, 510b.

The tractor vehicle 502 has a brake system 520, which comprises a first reservoir 521 for a rear-axle brake circuit 522, a second reservoir 523 for a front-axle brake circuit 524, and a third reservoir 525 for a trailer brake circuit 533 and an immobilizing brake circuit.

As a central and superordinate control unit, a central module 527 is provided, which operates purely electrically. Said central module is connected to an electropneumatic brake transducer 528, and controls the service braking during travel. For this purpose, the central module 527 is connected to a front-axle modulator 529, which controls the brake force in two front service brakes 530a, 530b, and a rear-axle modulator 531, which controls the brake force in two service brakes 532a, 532b of the rear axle. Here, the service brakes 532a, 532b are formed here as so-called Tristop brakes, and comprise both conventional pneumatic brake cylinders as service brakes and also integrated spring-type immobilizing brakes, as will be described in more detail further below.

In this exemplary embodiment, the brake system 520 also comprises an electropneumatic control module 1. For the activation of an immobilizing brake in the service brakes 532a, 532b, the brake system 520 furthermore has an electrical manual brake switch 534. In exemplary embodiments which will be discussed in more detail, the electrical manual brake switch 534 is electrically coupled to the electropneumatic control module 1 (as shown in FIG. 1).

The further elements shown in FIG. 1 are, in this exemplary embodiment, of a purely illustrative nature and include for example ABS modules 535a, 535b, a control unit 536 for autonomous driving, an energy source 537 for electrical energy, an SAE unit 538, steering angle sensors 539, and sensors 540a, 540b, 540c, 540d for brake pad wear sensing and sensors 541a, 541b, 541c, 541d for the rotational speed of the corresponding wheels 507a, 507b, 507c, 507d.

As can be seen in FIG. 1, the electropneumatic control module 1 is connected via a signal line 550 to the electrical manual brake switch (HCU) 534, via a redundancy pressure feed line 552 to the brake transducer 528, via a first, direct CAN bus 554 to the central module 527, via a second, indirect CAN bus 556 to the SAE unit 538, that is to say the vehicle bus (and via this, in turn, to the central module 527), via a voltage supply 557 to the energy source 537, via a voltage supply 558 to the manual brake switch 534, and via pneumatic lines 560a, 560b to the spring-type actuators of the (Tristop) service brakes 532a, 532b. For the control of the trailer vehicle 504, the electropneumatic control module 1 is connected via a trailer supply pressure port 21 to the port 515, which is also referred to as "red coupling head", and via a trailer brake pressure port 22 to the port 516, which is also referred to as "yellow coupling head". The ports and the function thereof in relation to the electropneumatic control module 1 will be discussed in more detail below.

Figure 2:
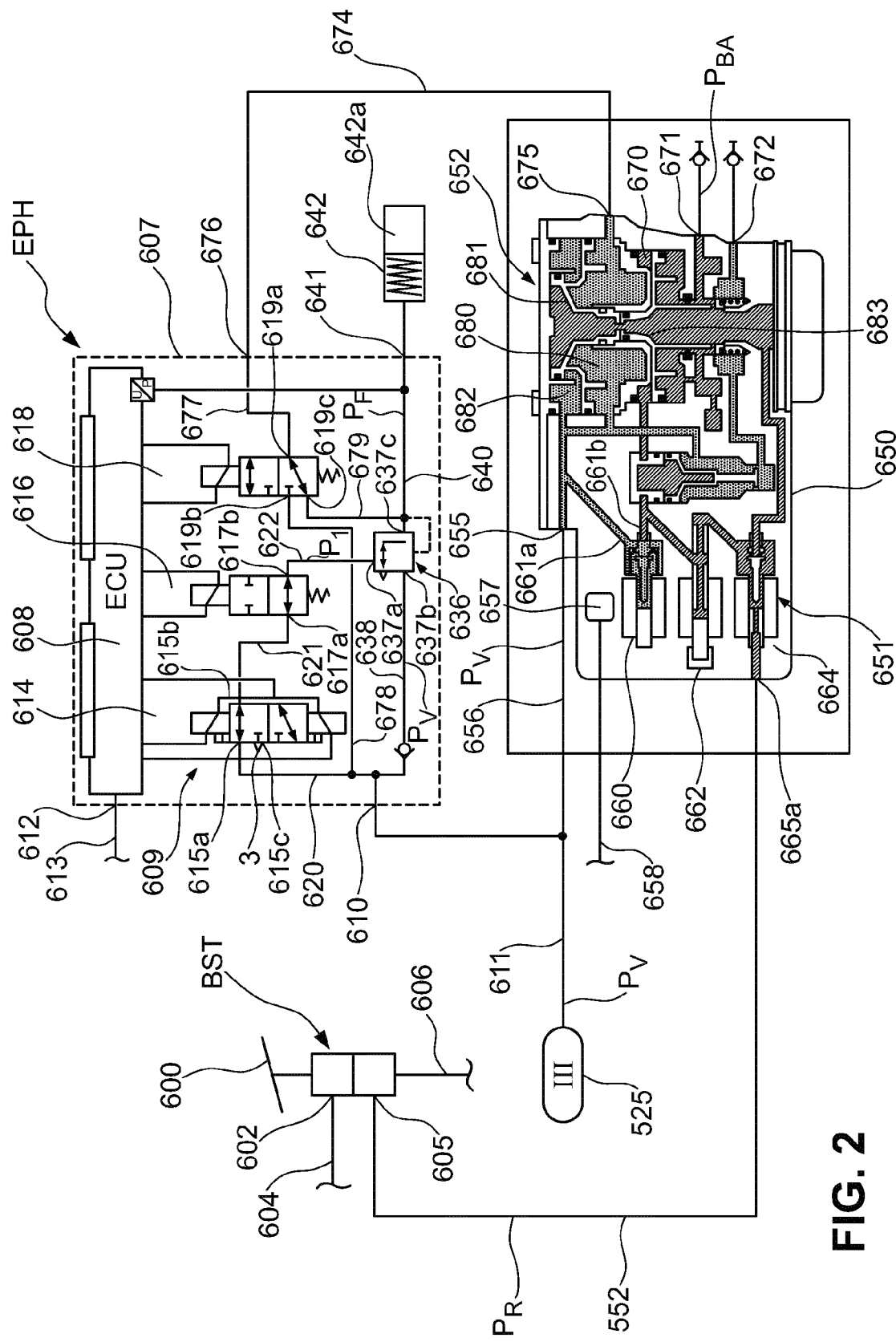
FIG. 2 is a schematic illustration according to the prior art with a trailer control unit and an immobilizing brake unit.

FIG. 2 now firstly illustrates a more detailed layout according to the prior art of a combination of a trailer control unit TCV and an immobilizing brake unit EPH, which are separate from one another. The overview in FIG. 2 furthermore shows an electropneumatic brake transducer BST with a foot-operated pedal 600, an electric travel transducer 602, which is connected via an electrical line 604 to a central module 527 which is not shown (see FIG. 1), and a pneumatic output 605, which is connected to a redundancy pressure feed line 552. Via a further pneumatic line 606, the brake transducer BST is connected to the first and/or second reservoir 521, 523. A reservoir pressure therefore prevails in the pneumatic line 606. By actuation of the foot-operated pedal 600, a pneumatic brake pressure, specifically the redundancy pressure $P_R$, is output in the line 552. The redundancy pressure $P_R$ is proportional to the manually predefined target deceleration.

The immobilizing brake unit EPH has a separate housing 607, which has a control unit 608 and an immobilizing brake valve unit 609. Via a reservoir input 610, the immobilizing brake unit EPH is likewise connected, via a reservoir line 611, to the reservoir 525. The reservoir pressure Pv prevails, in turn, in the reservoir line 611. In the embodiment shown, the electronic control unit 608 of the immobilizing brake unit EPH is likewise connected, via an electrical connection 612 and a signal line 613, to the central module 527 which is not shown in FIG. 2 (see FIG. 1), although other connections may be provided in addition or alternatively. The control unit 608 is designed to control the immobilizing brake valve unit 609. In this exemplary embodiment, which belongs to the prior art, the immobilizing brake valve unit 609 has a bistable valve 614, a 2/2 directional valve 616, and a 3/2 directional valve 618. The bistable valve 614 has a first port 615a, a second port 615b, and a third port 615c. The first port 615a is connected via a pneumatic line 620 to the reservoir input 610. The third port 615c is connected to a pressure sink 3. The second port 615b is connected via a pneumatic line 621 to a first port 617a of the 2/2 directional valve 616. The 2/2 directional valve 616 is preloaded by spring loading into a first, open switching position, such that, when electrically deenergized, it is situated in the first switching position shown in FIG. 2. In the second switching position, which is not shown in FIG. 2, the 2/2 directional valve 616 is shut off. A pneumatic line 622 is connected to the second port 617b of the 2/2 directional valve.

The immobilizing brake unit EPH furthermore has a relay valve 636, which is connected by means of its control input 637a to the pneumatic line 622. By means of a reservoir port 637b, the relay valve 636 is connected via a pneumatic line 638 to the reservoir input 610, such that the reservoir pressure Pv prevails in the pneumatic line 638. A working output 637c of the relay valve 636 is connected to a spring-type actuator line 640, which leads to a spring-type actuator port 641 to which a spring-type actuator 642 is connected. It should be understood that, in practice, more than one spring-type actuator 642 may be connected, in particular two, as described in FIG. 1 with regard to the Tristop brakes 532a, 532b. in general, it is however also possible for further vehicle axles to have Tristop brakes, which would likewise be activated via the spring-type actuator port 641.

During normal driving operation, the cylinder 642a of the spring-type actuator 642 is aerated, and the bistable valve 614, and the 2/2 directional valve 616, are in the switching positions shown in FIG. 2. At the port 615a, the pressure Pv prevails, which, via the line 621, the 2/2 directional valve 616 and the line 622, prevails as control pressure $P_1$ at the control input 637a of the relay valve 636. The relay valve 636 then outputs, at the working output 637c, a corresponding spring-type actuator working pressure $P_F$, which serves for aerating the cylinder 642a, such that the spring-type actuators 642 are released. For auxiliary braking, it is now possible for the bistable valve 614 to be switched into the second switching position (not shown in FIG. 2) and for the spring-type actuators 642 to be ventilated in stepped fashion by means of the 2/2 directional valve 616. In this way, it is possible for a predetermined target deceleration, which is provided by a central module 527 via the line 613 to the control unit 608 or by means of the manual brake switch 534, to be output.

To realize a corresponding deceleration at a trailer vehicle 504 also, the immobilizing brake unit EPH is coupled to the trailer control unit TCV.

The trailer control unit TCV has a housing 650, an inlet-outlet valve unit 651, an inverse relay valve 652, and a trailer breakaway valve 654. On the housing 650, there is provided a port 655 for a pneumatic supply line 656, in which the reservoir pressure $P_V$ prevails. Via an electronic connection 657 and a signal line 658, the trailer control unit TCV is connected to the central module 527 (not shown in FIG. 2, see FIG. 1) and receives control signals for the inlet-outlet valve unit 651. The inlet-outlet valve unit 651 is controlled directly by the central module 527. The inlet-outlet valve unit 651 has an inlet valve 660, an outlet valve 662 and a redundancy valve 664. The redundancy valve 664 is connected by means of a first port 665a to the redundancy pressure feed line 552, and the redundancy pressure $P_R$ prevails at the port 665a. The inlet valve 660 is connected by means of a first port 661a to the port 655 and by means of a second port 661b to a first control chamber 670 of the inverse relay valve 652. Connected between the port 661b and the control chamber 670 is the trailer breakaway valve

654, which will however not be described in detail below. Said trailer breakaway valve serves for permitting safe braking even in the event of a breakaway of the pneumatic line 514 to the trailer.

Furthermore, the trailer control unit TCV has a trailer brake pressure port 671 and a trailer supply pressure port 672. The trailer supply pressure port 672 is connected to the port 516 (see FIG. 1), whereas the trailer brake pressure port 671 is connected to the port 515 (see FIG. 1). By means of corresponding switching of the inlet valve 660, of the outlet valve 662 and, if appropriate, of the redundancy valve 664, a desired brake pressure $P_{BA}$ for the trailer vehicle can then be output at the port 671.

To now also use the service brakes 510a, 510b of the trailer vehicle 504 as an immobilizing brake in the situation in which the spring-type actuators 642 are ventilated by means of the immobilizing brake unit EPH, according to the prior art, a parking brake pressure line 674 is provided which runs from a port 675 on the trailer control unit TCV to a port 676 on the immobilizing brake unit EPH. The port 676 is connected via a pneumatic line 677 to a first port 619a of the 3/2 directional valve 618. A second port 619b of the 3/2 directional valve 618 is connected via a pneumatic reservoir line 678 to the reservoir input 610, such that the reservoir pressure $P_V$ prevails in said pneumatic reservoir line. The third port 619c of the 3/2 directional valve 618 is connected via a branch line 679 to the spring-type actuator line 640, such that, when the 3/2 directional valve 618 is in the switching position shown in FIG. 2, the pressure of the spring-type actuator port 641 is output at the port 675.

Since the spring-type actuators 642 however act inversely (that is to say do not impart braking in the aerated state and impart braking in the ventilated state), the functionality by means of the relay valve 652 must be configured inversely. That is to say, in the case of a pressure being output at the port 675, no brake pressure $P_{BA}$ should be output at the port 671; however, in the case of the port 675 being ventilated, a brake pressure $P_{BA}$ should be output at the port 671. For this purpose, the inverse relay piston 681 has a second control chamber 680, which is connected to the port 675. The second control chamber 680 is delimited by the inverse relay piston 681, which simultaneously forms a third control chamber 682, at which the reservoir pressure Pv prevails. Through corresponding design of the control surfaces of the inverse relay piston 681, the inverse relay piston 681 is thus, in the presence of a pressure at the port 675, moved such that the relay piston 683 can act freely, whereas, when the port 675 is ventilated, the relay piston 683 is pushed downward in FIG. 2 by the inverse relay piston 681, such that a brake pressure $P_{BA}$ is output at the port 675.

Since this design is highly cumbersome, embodiments of the invention to specify a simpler solution in the case of which, in particular, a complex trailer control unit TCV with an inverse relay valve 652 is not required, and in particular no inverse relay piston 681 is required.

Figure 3:
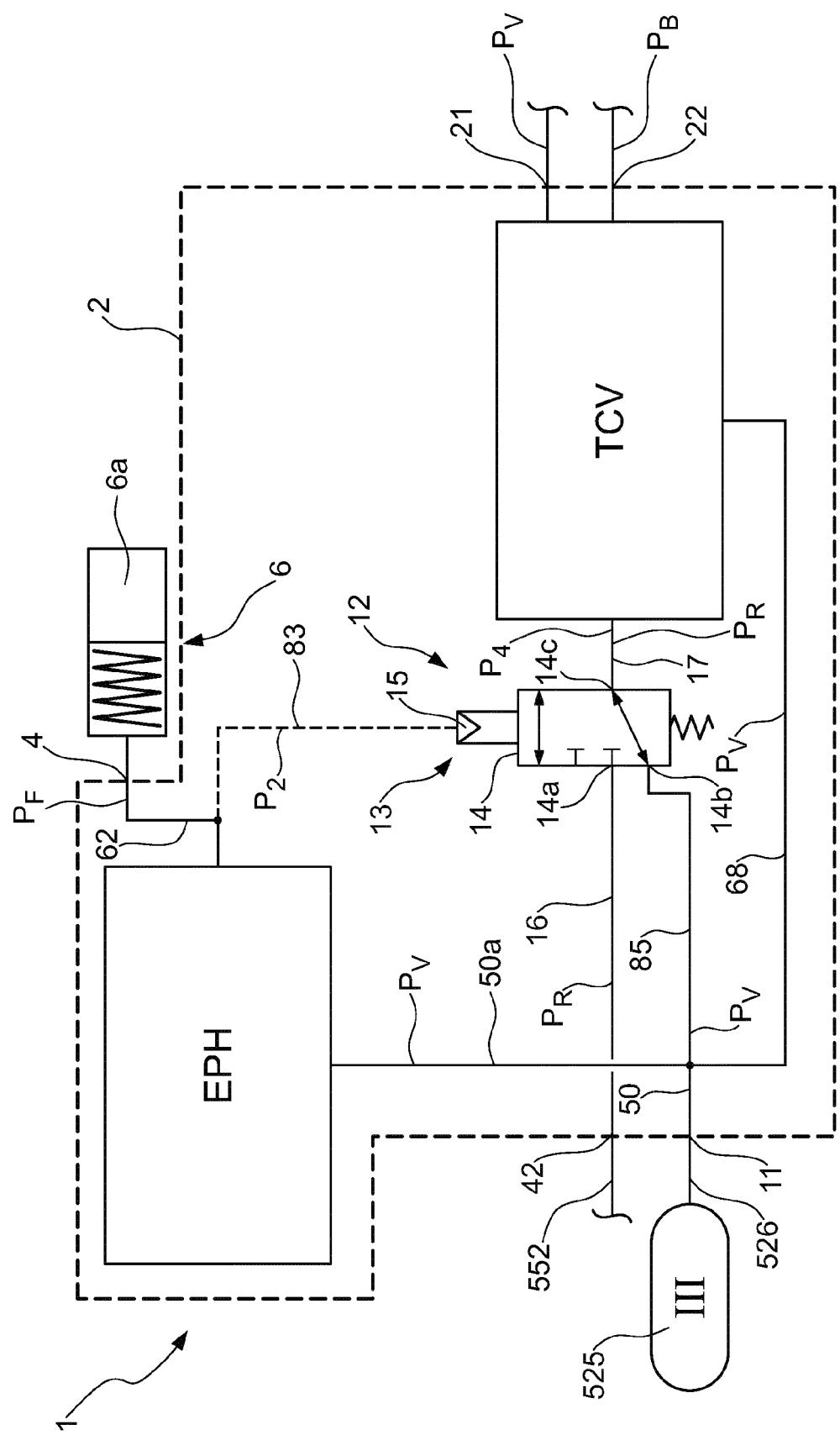
FIG. 3 shows a first exemplary embodiment of an electropneumatic control module according to the invention.

FIG. 3 shows a first exemplary embodiment of the electropneumatic control module 1 for an electronically controllable pneumatic brake system 520 for a vehicle combination 500 with a tractor vehicle 502 and a trailer vehicle 504.

The electropneumatic control module 1 has a trailer control unit TCV and an immobilizing brake unit EPH. Both are integrated into a common housing 2.

Figure 4:
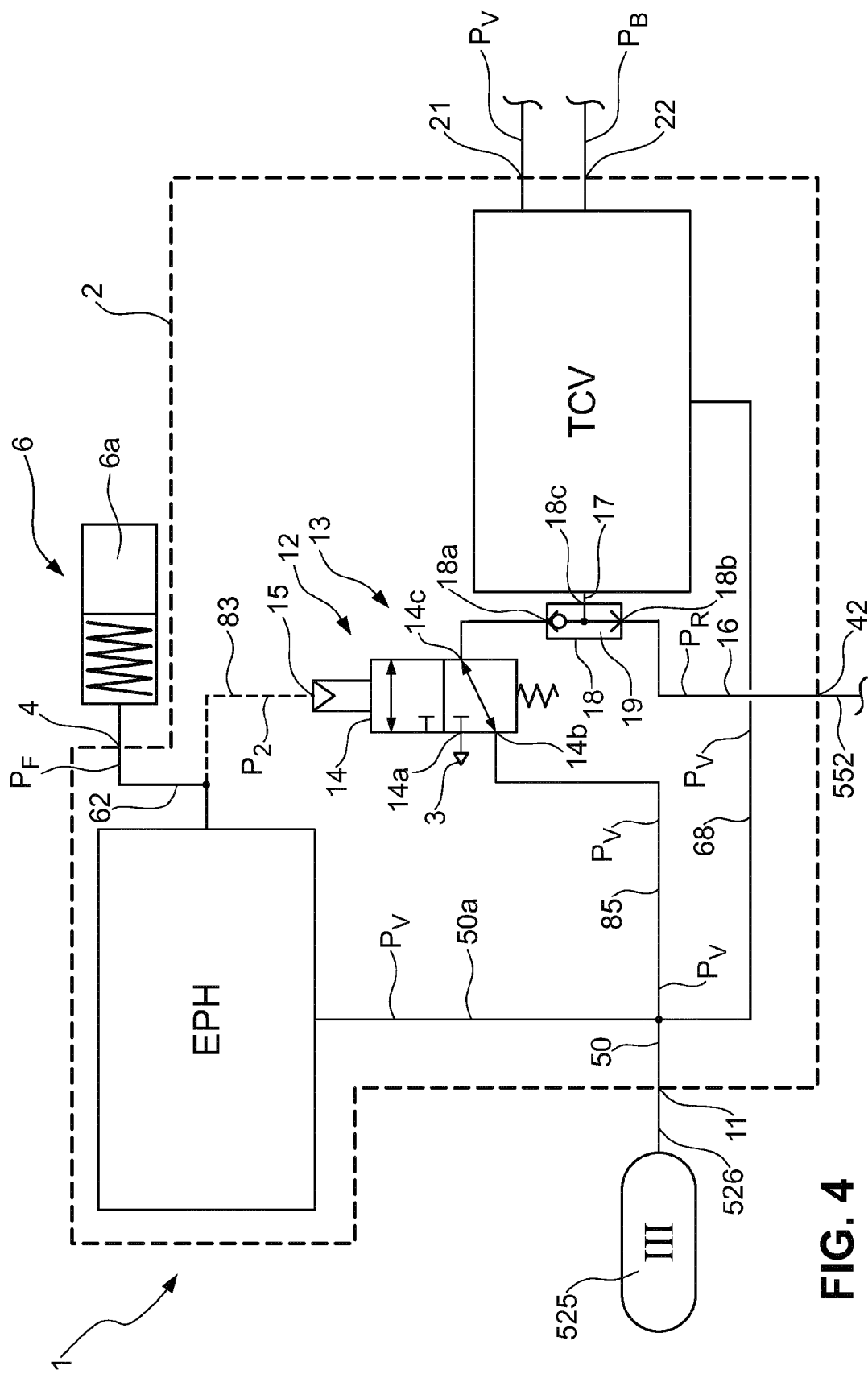
FIG. 4 shows a second exemplary embodiment of an electropneumatic control module according to the invention.

Although FIGS. 3 and 4 show merely schematic illustrations in which the immobilizing brake unit EPH and the trailer control unit TCV are illustrated only schematically, they comprise the valves that are not shown in FIGS. 3 and 4.

In FIG. 3, for the electropneumatic control module 1, only the pneumatic ports are illustrated, specifically the reservoir input 11, which is connected via the reservoir feed line 526 to the third compressed-air reservoir 525, the redundancy port 42, which is connected via a redundancy pressure feed line 552 to a brake transducer 528 which is not shown in FIG. 3, the spring-type actuator port 4, to which one or more spring-type actuators 6 are connected, and the trailer supply pressure port 21 and the trailer brake pressure port 22. In the interior of the housing 2, a reservoir distribution line 50 runs from the reservoir input 11. Of the reservoir distribution line 50, a first portion 50a runs to the immobilizing brake unit EPH in order to supply reservoir pressure $P_V$ to the immobilizing brake unit EPH. The immobilizing brake unit EPH is provided for outputting, in a spring-type actuator line 62, a spring-type actuator working pressure $P_F$ which serves for aerating the cylinder 6a of the spring-type actuator 6.

Furthermore, a third reservoir pressure branch line 68 runs to the trailer control unit TCV in order to supply pressure $P_V$ to the trailer control unit TCV. The trailer control unit TCV serves for providing a reservoir pressure $P_V$ at the trailer supply pressure port 21 and outputting, at the trailer brake pressure port, a brake pressure $P_B$ by means of which service brakes 510a, 510b of the trailer brake system 508 can be braked.

The exact layout of the trailer control unit TCV and of the immobilizing brake unit EPH may be configured in any desired manner in order to perform the stated functions. One specific exemplary embodiment will be discussed below with reference to FIGS. 5 and 6.

The parking brake valve unit 12 serves for outputting, on the basis of the aeration or ventilation of the spring-type actuator 6, a corresponding brake pressure $P_B$ at the trailer brake pressure port 22, such that, when the spring-type actuators 6 are ventilated, the brake pressure $P_B$ is output in order to brake the service brakes 510a, 510b of the trailer vehicle 504 in order to additionally brake the trailer vehicle 504 in a park position.

The parking brake valve unit 12 has a pneumatically controlled switching valve 13 which has a pneumatic control input 15 for receiving a pneumatic control pressure $P_2$, wherein, when the spring-type actuator port 4 is connected to a pressure sink (not shown in FIG. 3; see FIG. 5), that is to say when the spring-type actuator 6 is ventilated, the pneumatically controlled switching valve 13 is switched such that a brake pressure $P_B$ can be output at the trailer brake pressure port 22.

The particular advantage here lies in the fact that there is no need to use an inverse relay piston, but the pneumatically controlled switching valve 13 is rather switched on the basis of the control pressure $P_2$, which is in particular independent of an electrical energization of the valve. In this exemplary embodiment, it is preferable, as control pressure $P_2$, to use the spring-type actuator working pressure $P_F$ which, via a pneumatic control line 83, prevails as control pressure $P_2$ at the control input 15 of the pneumatically controlled switching valve 13. The pneumatic control line 83 branches off from the spring-type actuator line 62.

The pneumatically controlled switching valve 13 has a first and a second switching state, wherein the first switching state is shown in FIG. 3. The first switching state (shown in FIG. 3) is assumed if the spring-type actuators 6 are ventilated, that is to say the spring-type actuator working pressure $P_F$ is low, and in particular corresponds to the ambient pressure. The second switching state, which is not shown in FIG. 3, is assumed by the pneumatically controlled switching valve 13 if the spring-type actuator working pressure $P_F$ is high, that is to say in particular when spring-type actuators 6 are aerated. In the specific embodiment in FIG. 3, the pneumatically controlled switching valve 13 is formed as a 3/2 directional valve 14 and has a first port 14a, a second port 14b and a third port 14c.

The first port 14a is connected to the first redundancy pressure line 16. The second port 14b of the pneumatically controlled 3/2 directional valve 14 is connected to a sixth supply pressure branch line 85, which is connected to the reservoir distribution line 50. Thus, the redundancy pressure $P_R$ prevails at the first port 14a and the reservoir pressure $P_V$ prevails at the second port 14b.

During normal driving operation, the spring-type actuators 6 are aerated, and the control pressure $P_2$ prevails at the control input 15. The switching valve 13 is then in the second switching position (not shown in FIG. 3), and the third port 14c is connected to the first port 14a, such that the redundancy pressure $P_R$ is output from the redundancy pressure port 42 into the second redundancy pressure line 17. The redundancy pressure $P_R$ from the second redundancy pressure line 17 is then processed in the trailer control unit TCV (this will be described in detail further below).

If the vehicle combination 500 is now parked and placed into a park position, the spring-type actuators 6 are ventilated on the basis of a signal, for example from the manual brake switch 534. Owing to the withdrawal of the control pressure $P_2$, the switching valve 13 switches into the unpressurized, first switching position (shown in FIG. 3), and the reservoir pressure $P_V$ is output into the redundancy pressure line 17. Owing to the outputting of the reservoir pressure $P_V$ in the second redundancy pressure line 17, the brake pressure $P_B$ is consequently output at the trailer brake pressure port 22, and the service brakes 510a, 510b of the trailer vehicle 504 are engaged.

In this exemplary embodiment, an automated engagement of the service brakes 510a, 510b of the trailer vehicle 504 is thus realized by means of the switching valve 13 in a manner dependent on the spring-type actuator working pressure $P_F$.

FIG. 4 shows a variant in relation to FIG. 3. Identical and similar elements are denoted by the same reference designations, and in this respect reference is made to the above description relating to FIG. 3 in its entirety. Below, in particular the differences between the first exemplary embodiment (FIG. 3) and the second exemplary embodiment (FIG. 4) will be discussed.

By contrast to the first exemplary embodiment (FIG. 3), it is the case in the second exemplary embodiment (FIG. 4) that the first port 14a of the switching valve 13, which is formed as a 3/2 directional valve 14, is connected not to the first redundancy pressure line 16 but to a pressure sink 3. By contrast to the first exemplary embodiment, the third port 14c is now connected to a first shuttle valve input 18a of a shuttle valve 18. The second shuttle valve input 18b is connected to the first redundancy pressure line 16. The shuttle valve output 18c then opens into the second redundancy pressure line 17, which in turn leads to the trailer control unit TCV. That is to say, in this exemplary embodiment, both the reservoir input 11 and the redundancy port 42 again open into the second redundancy pressure line 17, but via a shuttle valve 18. The shuttle valve 18 is formed preferably as a double-acting check valve 19, and in particular as a so-called select-high valve.

The shuttle valve 18 thus, for the situation in which the 3/2 directional valve 14 is in the unpressurized switching position shown in FIG. 4, that is to say for example in the situation of parking and/or auxiliary braking, permits an override by a brake transducer if the redundancy pressure $P_R$ is higher than the pressure output by the 3/2 directional valve 14 at the port 14c.

Figure 5:
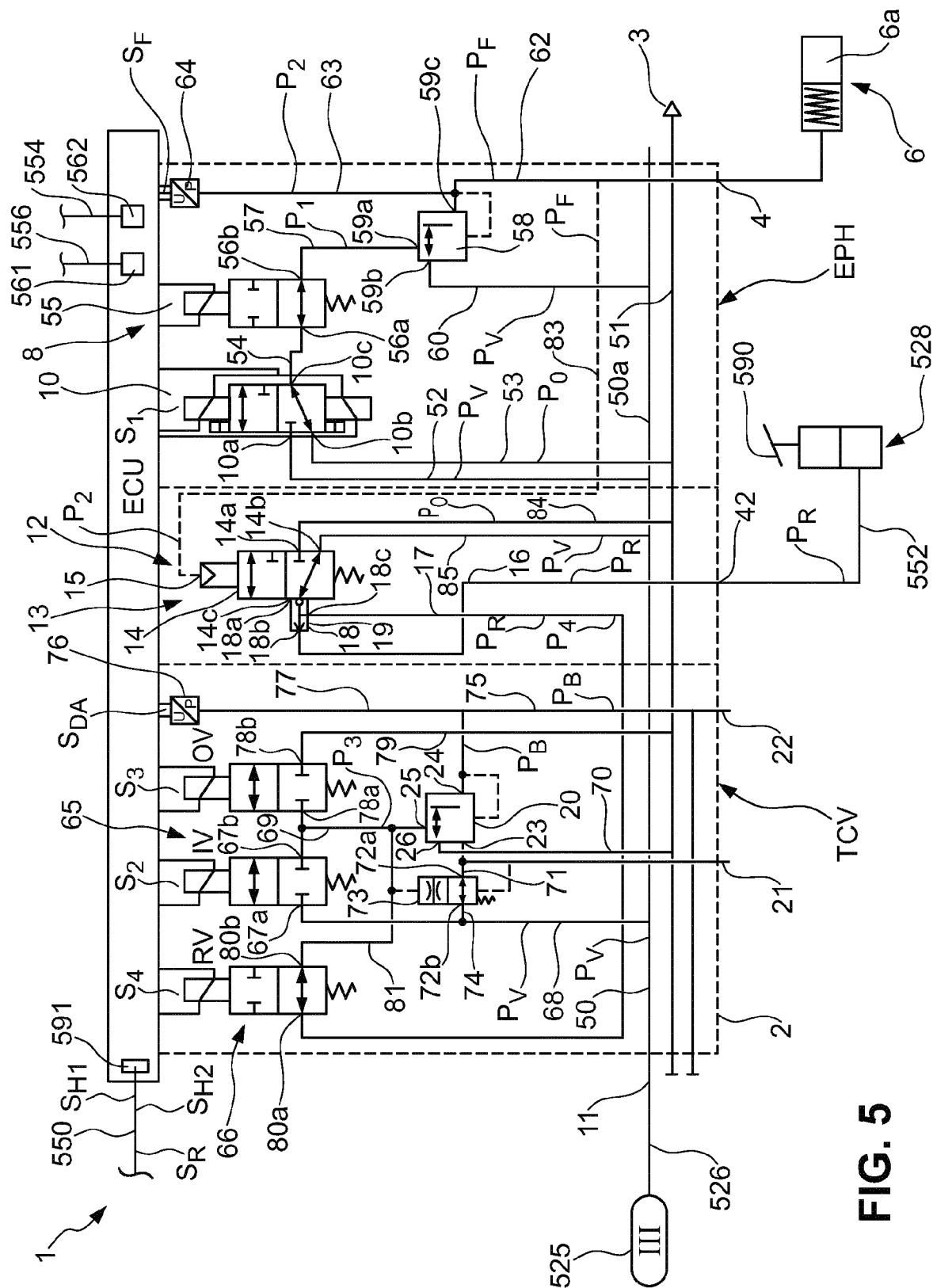
FIG. 5 shows a third exemplary embodiment, illustrated in greater detail, of an electropneumatic control module according to the invention.
Figure 6:
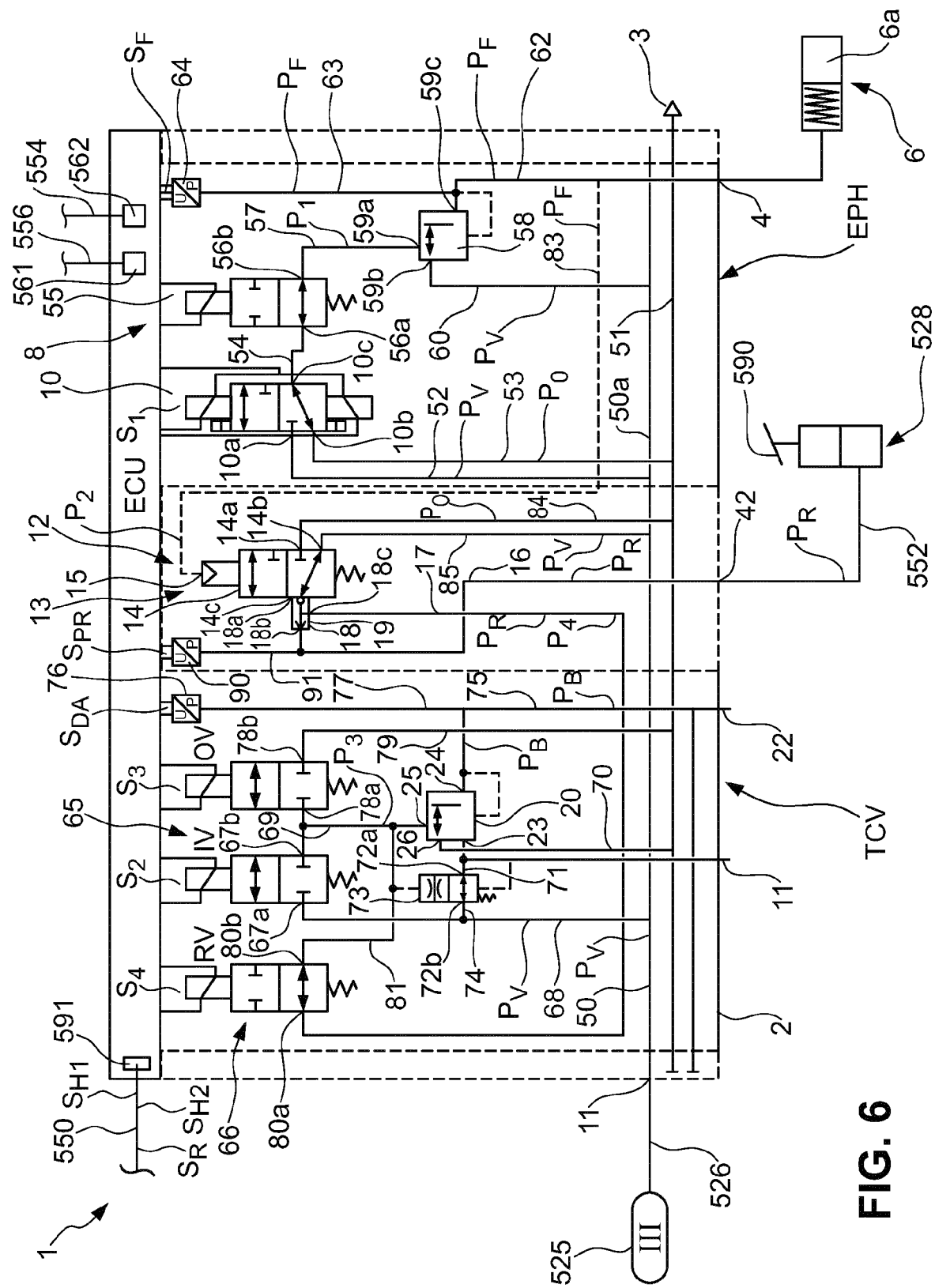
FIG. 6 shows a fourth exemplary embodiment, illustrated in greater detail, of an electropneumatic control module according to the invention.

FIGS. 5 and 6 now show more detailed exemplary embodiments, showing in particular one possible implementation for the individual valves of the immobilizing brake unit EPH and of the trailer control unit TCV and the electronic control unit ECU with the ports thereof.

FIG. 5 illustrates that, in the housing 2, there is furthermore integrated an electronic control unit ECU, which controls both the trailer control unit TCV and the immobilizing brake unit EPH. The electronic control unit ECU has a first bus or network connection 561, a second bus or network connection 562 and a connection 591 for the manual brake switch 534, which will be described in detail further below. The first bus connection 561 is connected directly to the central module 527 via the direct first CAN bus line 554. The second bus connection 562 is connected to the vehicle bus 538 via the second, indirect CAN bus line 556. Via the second bus connection 562, the control unit ECU can thus also receive signals from the control unit 536 for autonomous driving.

The housing 2 has a reservoir input 11, which is connectable via the pneumatic reservoir feed line 526 to the third reservoir 525. The reservoir distribution line 50 runs in the interior of the housing 2 from the reservoir input 11, via which reservoir distribution line the various elements are supplied with reservoir pressure $P_V$. A ventilation distribution line 51 likewise runs in the interior of the housing 2, which ventilation distribution line leads to a pressure sink 3 and via which ventilation distribution line various elements of the electropneumatic control module 1 can be ventilated.

In this exemplary embodiment, the immobilizing brake unit EPH is formed similarly to the prior art (see FIG. 2) and has an immobilizing brake valve unit 8. It should be understood that the immobilizing brake unit EPH may also have a different layout. The immobilizing brake valve unit 8 has a bistable valve 10. The bistable valve 10 is, as in the prior art, formed as a 3/2 directional valve, and has a first bistable valve port 10a, a second bistable valve port 10b and a third bistable valve port 10c. The first bistable valve port 10a is connected via a first reservoir branch line 52 to the reservoir distribution line 50. The second bistable valve port 10b is connected via a first ventilation branch line 53 to the pressure sink 3, such that ambient pressure $P_0$ prevails in the ventilation branch line 53. The third bistable valve port 10c is connected via a first control line 54. The bistable valve 10 has a first and a second switching position, wherein FIG. 5 illustrates the first switching position. In the first switching position, the second bistable valve port 10b is connected to the third bistable valve port 10c, such that the first control line 54 is connected to the pressure sink 3 and can be ventilated. In the second switching position which is not shown in FIG. 3, the first bistable valve port 10a is connected to the first control line 54, such that the reservoir pressure $P_V$ can be output in the first control line 54. The first control line 54 is furthermore connected to a first auxiliary brake valve port 56a of an auxiliary brake valve 55 of the immobilizing brake valve unit 8. The auxiliary brake valve 55 is electronically switchable and connected to the ECU. In this exemplary embodiment, said auxiliary brake valve is formed as a 2/2 directional valve and, aside from the first port 56a, has a second auxiliary brake valve port 56b. Said auxiliary brake valve is designed to be open when electrically deenergized. In the first switching position shown in FIG. 5, the auxiliary brake valve 55 is open, and in the second position which is not shown in FIG. 5, the auxiliary brake valve 55 is closed, such that the first auxiliary brake valve port 56a and the second auxiliary brake valve port 56b are separated.

Furthermore, the immobilizing brake valve unit 8 according to this exemplary embodiment has a first relay valve 58, as is basically also known in the prior art. The first relay valve 58 has a control port 59a, a reservoir port 59b and an output 59c. The control input 59a of the first relay valve 58 is connected via a second control line 57 to the second auxiliary brake valve port 56b. The reservoir port 59b of the first relay valve 58 is connected via a second reservoir branch line 60 to the reservoir distribution line 50, more specifically to the branch 50a which leads to the trailer control unit EPH, such that the reservoir pressure $P_V$ prevails at the reservoir port 59b of the first relay valve 58. The output 59c of the first relay valve 58 is connected via a spring-type actuator line 62 to the spring-type actuator port 4. By means of corresponding switching of the bistable valve 10 and of the auxiliary brake valve 55, a first control pressure $P_1$ is firstly output in the first and second control line 54, 57, which first control pressure corresponds, in the case of fully opened valves 10, 55, to the reservoir pressure $P_V$. Then, by means of the first relay valve 58, on the basis of the first control pressure $P_1$, a spring-type actuator working pressure $P_F$ is output at the output 59c, which spring-type actuator working pressure is provided at the spring-type actuator port 4. During normal driving operation, the cylinder 6a of the spring-type actuator 6 is aerated, such that the spring-type actuator brakes are released. It should be understood that more than one spring-type actuator 6 may be connected to the spring-type actuator port 4. In particular, two spring-type actuators 6 may be connected, as has also been discussed in FIG. 1 with regard to the Tristop brakes 532a, 532b. It is self-evidently also possible for four or more spring-type actuators 6 to be connected. The exact number and configuration is dependent on the type of tractor vehicle 502 in which the electropneumatic control module 1 is used.

The auxiliary brake valve 55 is used for auxiliary braking purposes and, when the bistable valve 10 is switched into the ventilation position shown in FIG. 5, specifically into the first switching position, permits a stepped aeration or ventilation by virtue of the auxiliary brake valve 55 firstly being closed and then being opened in pulsed fashion, such that the spring-type actuator 6 can be partially aerated or ventilated.

For closed-loop control purposes, the immobilizing brake unit EPH furthermore has a pressure sensor 64, which is connected via a first pressure measurement line 63 to the immobilizing brake line 62 and which thus detects the pressure $P_2$ or $P_F$. The pressure sensor 64 then provides a corresponding electronic signal $S_F$ to the ECU, such that closed-loop brake force control with regard to auxiliary braking can be performed by the ECU, and the ECU can control the bistable valve 10 and the auxiliary brake valve 55 correspondingly.

As can be seen in particular from the comparison of FIGS. 2 and 5, the immobilizing brake unit EPH has no 3/2 directional valve 618, which has been used in the prior art (see FIG. 2) to provide the output immobilizing brake pressure $P_2$ to the port 675 of the inverse relay valve 652 or, for the trailer monitoring position, to temporarily ventilate the service brakes 510a, 510b in the trailer vehicle 504, which corresponds to an outputting of the reservoir pressure $P_V$ at the output 676.

The trailer control unit TCV has a trailer control valve unit 65. The trailer control valve unit 65 has, as is basically known in the prior art, an inlet-outlet valve unit 66, also referred to as pilot-control unit, which is likewise known in the prior art (see FIG. 2), has an inlet valve IV, an outlet valve OV and a switching valve, formed here as a redundancy valve RV. Furthermore, the trailer control valve unit 65 has a second relay valve 20 which, according to one or more embodiments of the invention, is specifically formed not as an inverse relay valve but as a "normal relay valve". The inlet valve IV is formed as a 2/2 directional valve and has a first inlet valve port 67a and a second inlet valve port 67b. The first inlet valve port 67a is connected to a third reservoir pressure branch line 68, and the second inlet valve port 67b is connected to a third control line 69. Whilst the reservoir pressure $P_V$ prevails in the third reservoir pressure branch line 68, a third control pressure $P_3$ can be output in the third control line 69 by electrical switching of the inlet valve IV on the basis of a signal $S_2$ from the control unit ECU. The third control line 69 is connected to a control inlet 25 of the second relay valve 20. The relay valve 20 furthermore has an input 23, an output 24 and a ventilation output 26. The ventilation output 26 is connected via a second ventilation branch line 70 to the ventilation distribution line 50 and thus to the pressure sink 3. The input 23 serves for receiving a reservoir pressure $P_V$, and is initially connected to a fourth reservoir pressure branch line 71, which is connected to a first port 72a of the trailer breakaway valve 73. The trailer breakaway valve 73 is formed as a pneumatically switched 2/2 directional valve and is open when unpressurized, in the switching position shown in FIG. 5. With corresponding switching of the trailer breakaway valve 73, the first port 72a of the trailer breakaway valve 73 is connected via a throttle to the second port 72b of the trailer breakaway valve 73, which in turn is connected via a fifth reservoir pressure branch line 74 to the third reservoir pressure branch line 68. During normal operation, the trailer breakaway valve 73 is however in the position shown in FIG. 5, such that the reservoir pressure $P_V$ prevails at the input 23.

If the relay valve 20 now receives the control pressure $P_3$ at the control input 25, the relay valve 20 outputs a corresponding brake pressure $P_B$ at the output 24 and provides said brake pressure at the trailer brake pressure port 22 via a trailer brake pressure line 75. For corresponding closed-loop pressure control, a brake pressure sensor 76 for the trailer control unit TCV is provided, which brake pressure sensor is connected via a brake pressure measurement line 77 to the trailer brake pressure line 75 and provides a corresponding pressure signal $S_{DA}$ at the control unit ECU.

The outlet valve OV is electropneumatically switched and, upon receipt of a signal $S_3$ from the control unit ECU, can be moved from the first switching state shown in FIG. 5, in which said outlet valve is closed, into an open switching state, which is not shown in FIG. 5. The outlet valve OV is closed when electrically deenergized.

The outlet valve OV is provided for ventilating the brakes and thus for reducing a brake pressure $P_B$. Like the inlet valve IV, the outlet valve OV is provided as a 2/2 directional valve and has a first outlet valve port 78a and a second outlet valve port 78b. The first outlet valve port 78a is connected to the third control line 69, and the second outlet valve port 78b is connected to a third ventilation branch line 79. The third ventilation branch line 79 runs from the second outlet valve port 78b to the ventilation distribution line 51 and thus to the pressure sink 3.

In one variant, the inlet and outlet valve IV/OV are integrated and formed as a 3/2 directional valve, wherein a first port is connected to the line 68, a second port is connected to the line 69, and a third port is connected to the line 79.

In order, in a fault situation in which no signals $S_2$, $S_3$ are provided by the control unit ECU and the inlet and outlet valves IV, OV are electrically deenergized, to be able to manually replace the brake pressure $P_B$ that is output by the control unit ECU in the normal situation, the electropneumatic control module 1 has a redundancy port 42. A brake transducer 528 is connected to the redundancy port 42 via a redundancy pressure feed line 552. The brake transducer 528 is identical to the BST from FIG. 2 according to the prior art. In the interior of the housing 2, a first redundancy pressure line 16 is connected to the redundancy port 42. Furthermore, the first redundancy pressure line 16 is connected to the second input 18*b* of a shuttle valve 18 (see also the second exemplary embodiment as per FIG. 4). The shuttle valve 18 is designed to switch back and forth between the first input 18*a* and the second input 18*b*, to which the first redundancy pressure line 16 is connected. The shuttle valve 18 may thus basically be understood as a 3/2 directional valve. The output 18*c* of the shuttle valve 18 is connected to a second redundancy pressure line 17. The redundancy pressure line 17 runs to a first redundancy valve port 80*a*. The second redundancy valve port 80*b* is connected to a redundancy pressure control line 81, which opens into the third control line 69 and thus into the control input 25 of the second relay valve 20. The redundancy valve RV is formed as a 2/2 directional valve and has a first and a second switching position, wherein said redundancy valve is shown in the first, open switching position in FIG. 5.

The redundancy valve RV is open when electrically deenergized and serves to be able to output a brake pressure $P_B$ even in the fault situation in which the inlet-outlet valve unit 66 is electrically deenergized. If, in the fault situation, a redundancy pressure $P_R$ is output in the redundancy pressure feed line 552 by actuation of the pedal 590, said redundancy pressure $P_R$ is provided at the control input 25 of the relay valve 20 via the first redundancy pressure line 16, the shuttle valve 18, the second redundancy pressure line 17, the open redundancy valve RV and the redundancy pressure control line 81. The brake pressure $P_B$ is consequently output at the output 24 of the second relay valve 20.

To link the trailer control unit TCV and the immobilizing brake unit EPH in order, as is already known in the prior art, to use the service brakes 510*a*, 510*b* of the trailer vehicle 504 also as parking brakes and thus output a brake pressure $P_B$ at the trailer brake pressure port 22 in the parked state whilst the spring-type actuators 6 are ventilated, the parking brake valve unit 12 is provided, with the pneumatically controlled switching valve 13 which has a pneumatic control input 15 for receiving a pneumatic control pressure $P_2$, wherein, when the spring-type actuator port 4 is connected to the pressure sink 3, that is to say when the spring-type actuator 6 is ventilated, the pneumatically controlled switching valve 13 is switched such that a brake pressure $P_B$ can be output at the trailer brake pressure port 22.

The pressure at the spring-type actuator port 4, that is to say the spring-type actuator working pressure $P_F$, is preferably used as control pressure. In the specific embodiment illustrated in FIG. 5, this is achieved by means of a pneumatic control line 83, which connects the spring-type actuator line 62 to the control input 15 of the pneumatically controlled switching valve 13 and provides the spring-type actuator working pressure $P_F$ as control pressure $P_2$ and the control input 15. That is to say, the spring-type actuator working pressure $P_F$ of the spring-type actuator port 4 and thus of the spring-type actuators 6 prevails at the control input 15 of the pneumatically controlled switching valve 13.

In one variant, the control line 83 may however also be connected to, for example, the line 57. In this case, the pressure $P_1$ is used as control pressure at the control input 15.

The pneumatically controlled switching valve 13 has (see also FIGS. 3 and 4) a first and a second switching state, wherein the first switching state is shown in FIG. 5. The first switching state (shown in FIG. 5) is assumed if the spring-type actuators 6 are ventilated, that is to say the spring-type actuator working pressure $P_F$ and thus also the second control pressure $P_2$ is low, and in particular corresponds to the ambient pressure $P_0$. The second switching state, which is not shown in FIG. 5, is assumed by the pneumatically controlled switching valve 13 if the second control pressure $P_2$ is high, that is to say in particular when spring-type actuators 6 are aerated. In the specific embodiment in FIG. 5, the pneumatically controlled switching valve 13 is formed as a 3/2 directional valve 14 and has a first port 14*a*, a second port 14*b* and a third port 14*c*. The first port 14*a* is connected via a fourth ventilation branch line 84 to the ventilation distribution line 51 and thus to the pressure sink 3. The second port 14*b* of the pneumatically controlled 3/2 directional valve 14 is connected to a sixth supply pressure branch line 85, which is connected to the reservoir distribution line 50. Thus, ambient pressure $P_0$ prevails at the first port 14*a* and the reservoir pressure $P_V$ prevails at the second port 14*b*.

During normal driving operation, the spring-type actuators 6 are aerated, and the pneumatically controlled 3/2 directional valve 14 is thus in the second switching position (not shown), and the ambient pressure $P_0$ is output at the third port 14*c*.

If the spring-type actuator 6 is now ventilated, be it owing to a parked position being assumed or owing to auxiliary braking by means of the spring-type actuators 6, the bistable valve 10 is firstly switched into the first switching position shown in FIG. 5, such that the control port 59*a* of the first relay valve 58 is switched into an unpressurized state, and consequently the spring-type actuator port 4 is ventilated via the output 59*c* of the first relay valve 58; the spring-type actuator working pressure $P_F$ falls. As a result of this, the control pressure $P_2$ also decreases, and the pneumatically controlled 3/2 directional valve 14 switches into the first switching position shown in FIG. 5. Consequently, a corresponding pressure $P_4$ is now output at the third port 14*c*, which pressure corresponds to the supply pressure $P_V$. The third port 14*c* is connected to the first input 18*a* of the shuttle valve 18. The shuttle valve 18 is formed in particular as a double-acting check valve 19, that is to say as a so-called select-high valve. The respectively higher pressure at the ports 18*a*, 18*b* is output at the output 18*c*. Thus, if, in the described situation, the pressure $P_4$ output at the third port 14*c* is higher than the pressure $P_R$ output in the redundancy pressure line 16, the pressure $P_4$ is output in the second redundancy pressure line 17.

In one variant, the redundancy valve RV is already switched into an electrically deenergized state, and thus opened, in this state, and the fourth control pressure $P_4$ consequently prevails at the control input 25 of the relay valve 20. In this way, a corresponding brake pressure $P_B$ is output at the trailer brake pressure port 22.

However, in a preferred variant, at the commencement of parking, the redundancy valve RV is initially electrically energized with the signal $S_4$ and closed; the pressure $P_4$ output by the switching valve 13 is initially locked out. The engagement of the service brakes 510*a*, 510*b* of the trailer vehicle 504 is realized upon the commencement of parking by means of the inlet-outlet valve unit 66, which is correspondingly switched by the control unit ECU. That is to say, if for example the manual brake switch 534 is actuated, the redundancy valve RV initially remains closed. The control unit ECU however switches the inlet valve IV such that the third control pressure $P_3$ prevails at the relay valve control input 25 and a corresponding brake pressure $P_B$ is output at the trailer brake pressure port 22, whilst the spring-type actuators 6 are ventilated, and impart their brake force, in a gradual manner. As soon as the spring-type actuators 6 have been ventilated to a certain degree, or have been completely ventilated, all of the valves RV, IV, OV of the inlet-outlet valve unit 66 are switched into an electrically deenergized state; the inlet valve IV closes, whilst the redundancy valve RV is opened. The fourth control pressure $P_4$ now prevails at the relay valve control input 25 via the switching valve 13 and the redundancy valve RV, and the brake pressure $P_B$ is output; the service brakes 510a, 510b of the trailer vehicle 504 remain engaged.

It should be understood that it is not imperatively necessary for the third port 14c of the pneumatically controlled 3/2 directional valve 14 to ultimately open into the second redundancy pressure line 17. It is likewise conceivable for the third port 14c to be connected via a separate switching valve directly on a separate pneumatic line to the control input 25 of the relay valve 20 or to a second control input (not shown) of the relay valve 20. The advantage of the shuttle valve 18 lies in the fact that overbraking can be prevented, because either the redundancy pressure $P_R$ or the pressure $P_4$ output at the third port 14c passes to the control input 25.

A further advantage lies in the fact that the redundancy valve RV can be used to assume a trailer monitoring position. The trailer monitoring position is necessary to check whether the vehicle combination 500 in the parked state is reliably held stationary even without engaged service brakes 510a, 510b of the trailer vehicle 504. For this purpose, the vehicle driver actuates the trailer monitoring position and waits for a predetermined time, for example three minutes, in order to check whether the vehicle combination 500 is safely stationary owing to the spring-type actuators 6 alone. In the trailer monitoring position, it is therefore important that, despite an engaged immobilizing brake, that is to say ventilated spring-type actuators 6, the service brakes 510a, 510b of the trailer vehicle 504 are not actuated, that is to say no brake pressure $P_B$ is output at the trailer brake pressure port 22.

For this purpose, in the trailer monitoring position, the redundancy valve RV is, by means of an electrical signal $S_4$, moved into the second switching state which is not shown in FIG. 5, and the outputting of the fourth control pressure $P_4$ at the control input 25 is blocked. In this case, despite switching of the pneumatically controlled 3/2 directional valve 14 and switching of the shuttle valve 18, no fourth control pressure $P_4$ is output at the control input 25. Also, a redundancy pressure $P_R$ cannot be output at the control input 25 of the relay valve 20.

In this exemplary embodiment, the electrical control unit ECU furthermore has an electronic connection 591 for receiving a redundant electronic brake signal $S_R$. The connection 591 is connected to the signal line 550, which leads to the manual brake switch (HCU) 534. The signal provided by the manual brake switch is received as redundant electronic brake signal $S_R$ at the control unit ECU.

Based on the received redundant brake signal $S_R$, the control unit ECU is designed to transmit a corresponding signal $S_2$ to the inlet valve IV, such that a control pressure $P_3$ is output at the control input 25 of the relay valve 20 in order to thus output a brake pressure $P_B$ at the trailer brake pressure port 22. Electronically output auxiliary braking is possible in this way.

FIG. 6 illustrates a fourth preferred exemplary embodiment of the invention. Identical and similar elements are denoted by the same reference designations, and in this respect reference is made to the above description relating to FIGS. 1 and 3 to 5 in its entirety. Substantially the differences will be discussed below.

The only difference between the third and fourth exemplary embodiments lies in a redundant pressure sensor 90. The redundant pressure sensor 90 is connected via a redundancy pressure measurement line 91 to the first redundancy pressure line 16. Consequently, the redundant pressure sensor 90 measures the pressure $P_R$ in the first redundancy pressure line 16, which is output manually at the redundancy pressure port 42 by actuation of the brake pedal 590. With reference to the first, second and third exemplary embodiment (FIGS. 1, 3, 4 and 5), it has already been described how the manually output redundancy pressure $P_R$ leads, via the first redundancy pressure line 16, the shuttle valve 18, the second redundancy pressure line 17, the redundancy valve RV, the redundancy pressure control line 81 and the relay valve 20, to a brake pressure $P_B$ output at the trailer brake pressure port 22. It has likewise been described that the manual brake switch 534 can provide a redundant electrical service brake signal $S_R$ at the port 591 of the control unit ECU.

The redundant pressure sensor 90 can be utilized for identifying a driver interaction in the case of autonomous control of the brake system 520. The redundant pressure sensor 90 measures the manually output redundancy pressure $P_R$ and provides a corresponding signal $S_{PR}$, preferably as a redundant electronic service brake signal $S_R$, at the control unit ECU.

The redundancy pressure signal $S_{PR}$ provided by the redundant pressure sensor 90 represents a driver demand, because the pressure sensor 90 detects the redundancy pressure $P_R$ output manually by means of the brake transducer 528. The control unit ECU is preferably configured to compare the signal $S_{PR}$, which it receives from the pressure sensor 90, with a service brake signal, which it receives for example from the control unit 536 for autonomous driving via the second CAN bus 554. If the redundant electronic service brake signal $S_R$ or the pressure signal $S_{PR}$ represents a greater deceleration demand than the service brake signal received from the control unit 536, the control unit ECU triggers the switching of the redundancy valve RV in order to permit the manual outputting of a brake pressure $P_B$ at the trailer brake pressure port 22 on the basis of the redundancy pressure $P_R$. In other words, if the driver demands a more intense deceleration than the central module 527 or the control unit 536 for autonomous driving, the central module is locked out, and the driver takes over manually.

FIG. 6 illustrates the second relay valve 20 in a pneumatic cross-sectional illustration. The relay valve 20 has the control input 25, the input 23 to which the fourth branch line 71 of the reservoir distribution line 50 is connected and at which the pressure $P_V$ thus prevails, an output 24, which is connected via the brake pressure control line 75 to the trailer brake pressure port 22 and via which the brake pressure $P_B$ is output, and a ventilation output 26, via which the output 24 can be ventilated and which is connected to the pressure sink 3. A pressure $P_0$ consequently prevails at the ventilation output 26, which pressure corresponds to the pressure of the pressure sink, in particular of the surroundings. In this exemplary embodiment, the ventilation output 26 runs via a noise damper 130, which is not shown in detail but which is known in the prior art.

Figure 7:
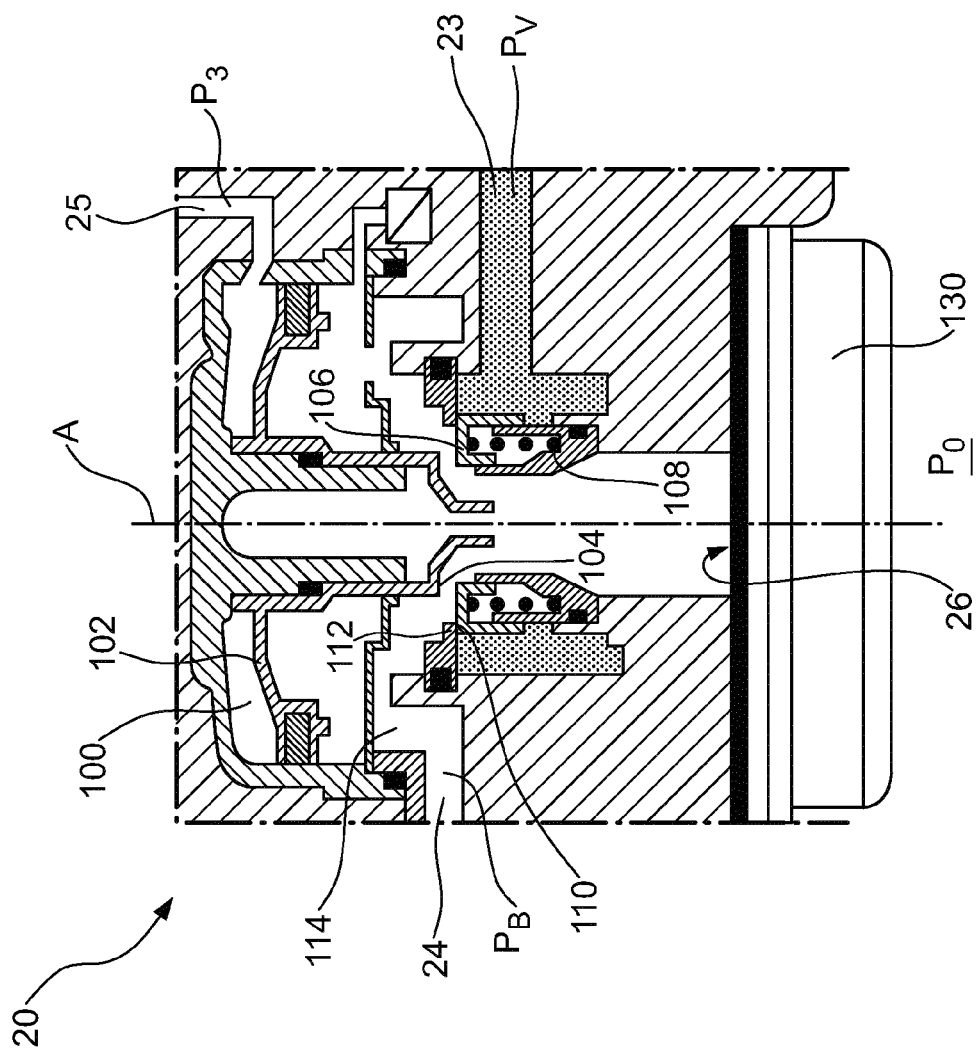
FIG. 7 is an illustration of a relay valve.

As can be seen in particular from FIG. 7, the relay valve 20 has a common control chamber 100, in this exemplary embodiment a single control chamber 100, into which the single control input 25 opens. Via the control input 25, both the control pressure $P_3$ and redundancy pressure $P_R$ can be output into the common control chamber 100; in this respect, only one common control chamber 100 is provided for the two control pressures $P_3$, $P_R$. The control chamber 100 thus performs two functions: firstly, by means of the control chamber 100, the brake pressure $P_B$ can be output in a manner dependent on the service brake control pressure $P_1$, and secondly, by means of the control chamber 100, the brake pressure $P_B$ can also be output in a manner dependent on the redundancy pressure $P_R$.

Provision may be made for further control inputs to open into the control chamber 100. The control chamber 100 acts on a single control piston 102. The single control piston 102 is guided so as to slide axially along an axis A. When the control input 25 is aerated with the control pressure $P_3$, the piston 102 can move downward in relation to FIG. 7 and, by means of a valve seat 104, makes contact with a corresponding slide ring 106, which is pushed in spring-loaded fashion into the axially upper position. A spiral spring 108 is provided for this purpose. The slide ring 106 has a second valve seat 110, which seals against projection 112 and thus initially holds the input 23 closed.

The control piston is shown in an open position in FIG. 7. In its shut-off position, the valve seat 104 is in contact with the slide ring 106. In the shut-off position, both the input 23 and the output 24 are closed off with respect to the ventilation output 26.

Owing to the output pressure $P_3$, a force acts on the control piston 102, which force leads to the opening of the valve seat 110, such that the pressure $P_V$ can pass over into the working space 114. The pressure in the working space 114 increases and leads to an opposing force on the control piston 102, such that the control piston moves back into the shut-off position. A brake pressure $P_B$ is correspondingly output at the output 24, and is held there. This construction is much simpler than the inverse relay piston described with reference to FIG. 2.

Figure 8:
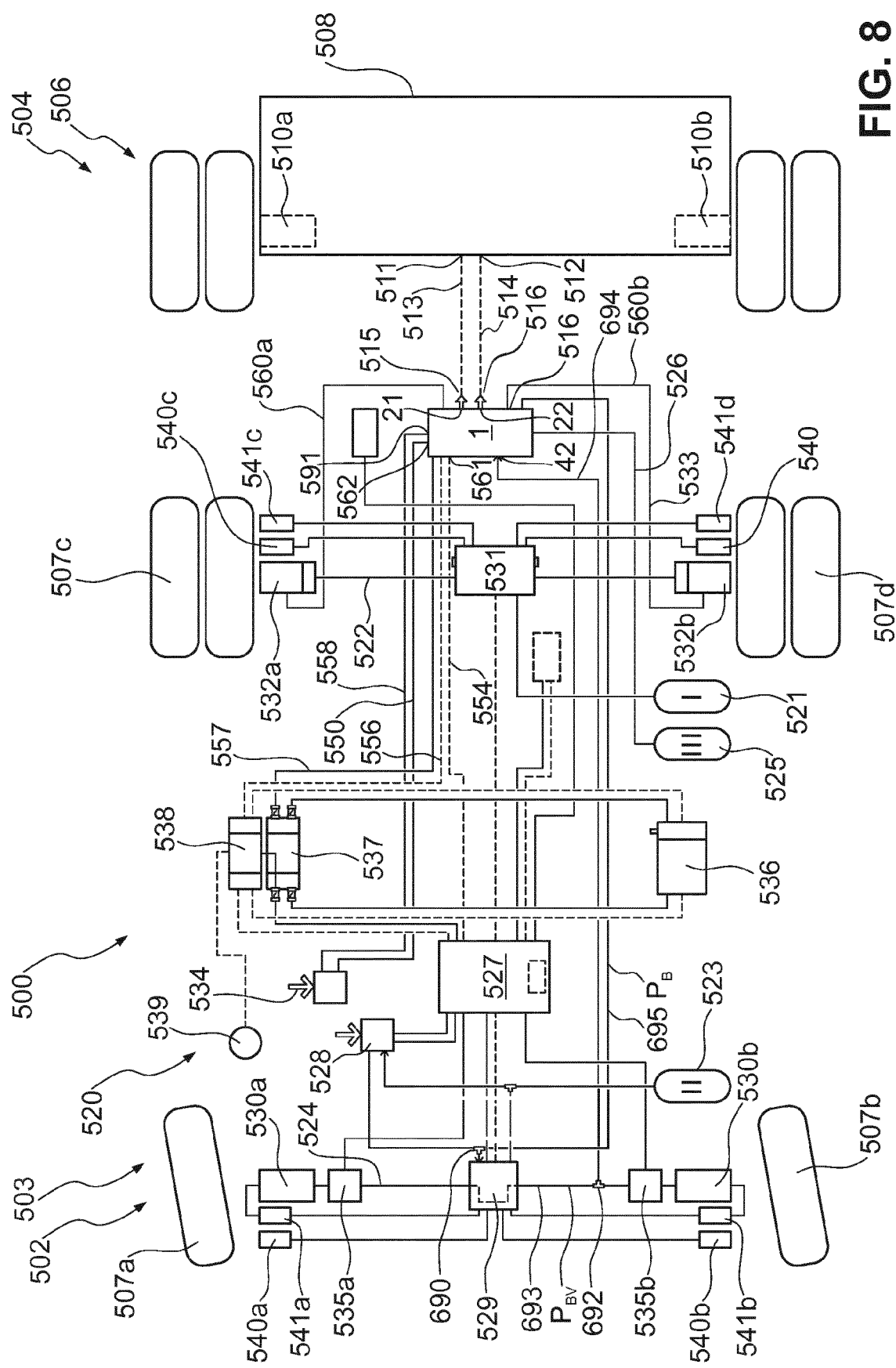
FIG. 8 shows a schematic overall layout of a brake system for a vehicle combination with an electropneumatic control module according to a fifth embodiment of the invention.

FIG. 8 now shows a fifth exemplary embodiment. The brake system 520 shown in FIG. 8 is basically similar to that according to FIG. 1, and identical and similar elements are denoted by the same reference designations. In this respect, reference is made to the above description of FIG. 1 in its entirety. Therefore, substantially the differences will be discussed below.

By contrast to the first exemplary embodiment, the redundancy port 42 is not connected via the redundancy pressure feed line 552 to the brake transducer 528; rather, the brake pressure of another vehicle axle, in this exemplary embodiment the front axle brake pressure $P_{BV}$, is output at the redundancy port 42. For this purpose, a second redundancy pressure feed line 694 is provided, which is connected via a T-piece 692 to a front-axle brake pressure line 693. Via this second redundancy pressure feed line 694, the front-axle brake pressure $P_{BV}$ of the service brakes 530a, 530b of the front axle 503 is output at the redundancy pressure port 42.

The brake transducer 528 is then, by contrast to the first exemplary embodiment (FIG. 1), connected via a front-axle shuttle valve 690 to the front-axle modulator 529 in order to redundantly output the brake transducer control pressure $P_{BST}$ at the front-axle modulator 529. If both the electropneumatic control module 1 is electrically deenergized owing to a fault and the front-axle modulator 529 is electrically deenergized owing to the fault or another fault, it is possible in this way for the brake transducer control pressure $P_{BST}$ that is output manually by means of the foot-operated pedal 600 to be output via the front-axle modulator 529 as redundancy pressure $P_R$ at the redundancy pressure port 42 of the electropneumatic control module 1.

Conversely, a control line 695 of the electropneumatic control module 1 is connected to the front-axle shuttle valve 690, into which control line the brake pressure $P_B$ of the trailer 504 is output by the electropneumatic control module 1. The control line 695 is shown in FIG. 8 as being connected separately to a front-axle control line port 696 of the electropneumatic control module 1; in other embodiments, it may also branch off from the pneumatic line 514 to the trailer vehicle 504.

The front-axle shuttle valve 690 is formed for example as a select-high valve, such that always the higher pressure of the brake pressure $P_B$ and the brake transducer control pressure $P_{BST}$ is output at the front-axle modulator 529.

Figure 9A:
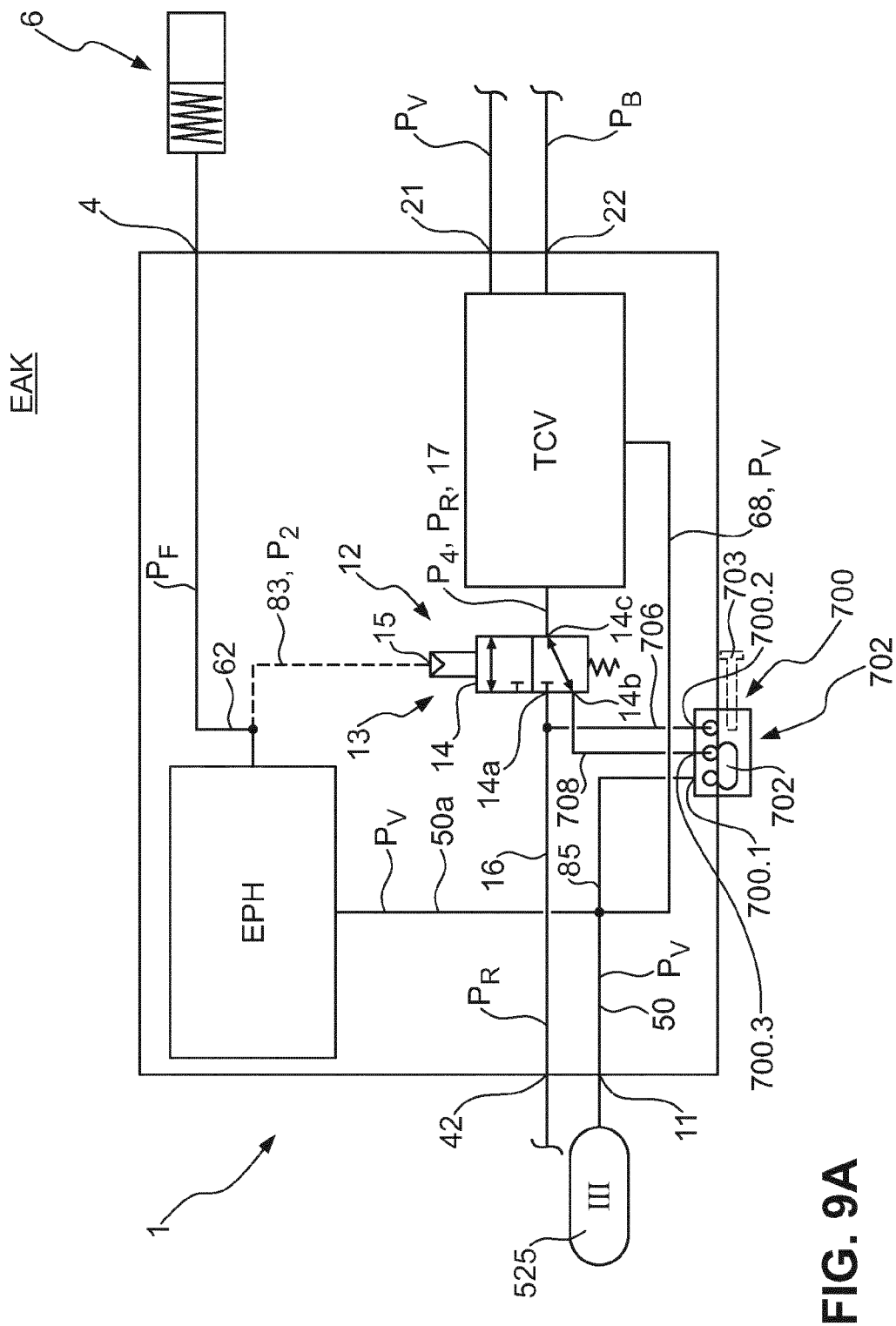
FIG. 9A shows a first exemplary embodiment of the electropneumatic control module with a configuration unit in a first switching position (European trailer configuration)
Figure 9B:
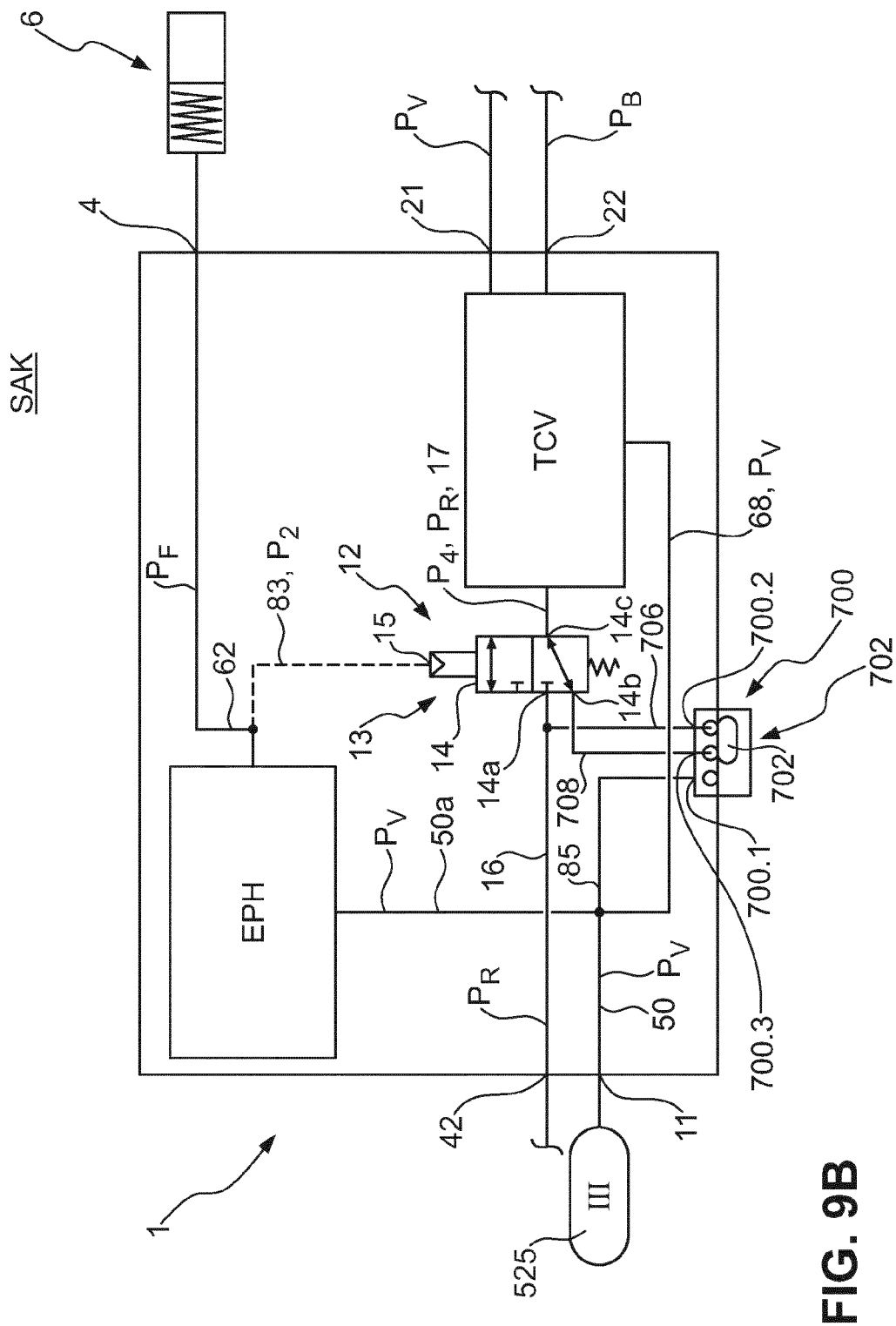
FIG. 9B shows the electropneumatic control module from FIG. 9A in a second switching position (Scandinavian trailer configuration)
Figure 10:
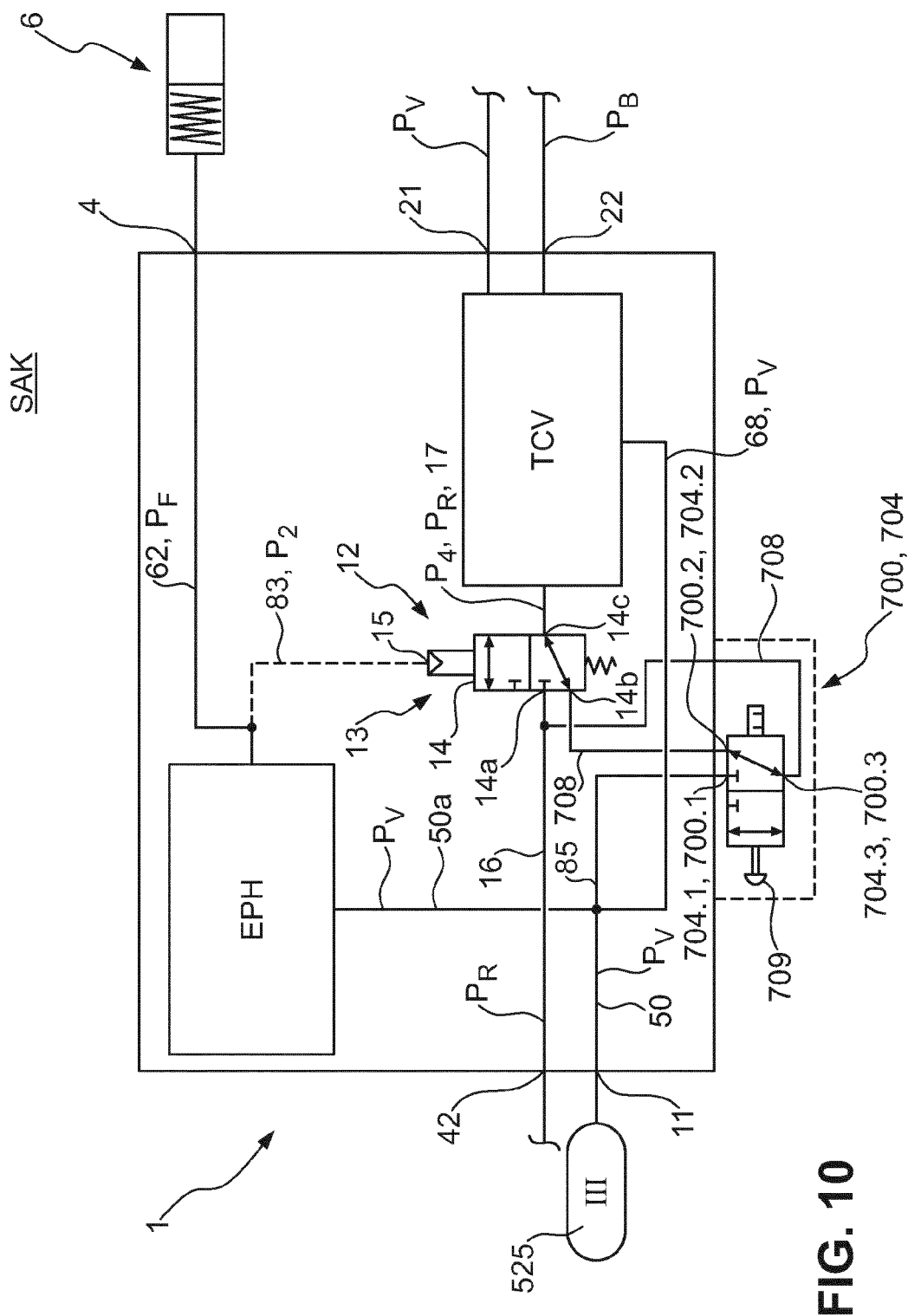
FIG. 10 shows a second exemplary embodiment of the electropneumatic control module with a configuration unit in a second switching position (Scandinavian trailer configuration).

FIGS. 9A to 10 now illustrate two exemplary embodiment of the electropneumatic control module 1, which has a configuration unit 700.

The configuration unit 700 serves for permitting not only "European trailer control" but also "Scandinavian trailer control". The previous exemplary embodiments were based on "European trailer control", in the case of which, in the parked state of the vehicle, a positive brake pressure, corresponding to the ventilated spring-type actuators, is output at the trailer vehicle in order to additionally brake the latter. In the case of "Scandinavian trailer control", the opposite is the case: In the parked state of the vehicle combination, the service brakes of the trailer vehicle should be released. The configuration unit 700 permits simple configuration between a European trailer configuration, in which European trailer control is possible, and a Scandinavian trailer configuration, in which Scandinavian trailer control is possible.

The embodiments shown in FIGS. 9A to 10 are basically based on the illustration of FIG. 3, and identical elements are denoted by the same reference designations. In this respect, reference is made to the above description relating to FIG. 3 in its entirety. In particular the differences in relation to FIG. 3 will be highlighted below.

FIGS. 9A and 9B firstly show a first exemplary embodiment, in which the configuration unit 700 has a pressure distributor plate 702. The configuration unit 700 has a first configuration port 700.1, a second configuration port 700.2, and a third configuration port 700.3. In the exemplary embodiment shown in FIGS. 9A and 9B, the first configuration port 700.1 is connected to the sixth reservoir pressure branch line 85, which in turn is connected to the reservoir input 11, such that the reservoir pressure $P_V$ prevails at the first configuration port 700.1. The second configuration port 700.2 is connected to a redundancy branch line 706, which branches off from the first redundancy pressure line 16. The redundancy branch line 706 need not imperatively branch off from the first redundancy pressure line 16, and may also be connected to the redundancy pressure port 42 in some other way. Consequently, the redundancy pressure $P_R$, when it is output, prevails at the second configuration port 700.2. Finally, the third configuration unit 700.3 is connected via a configuration line 708 to the second port 14b of the 3/2 directional valve 14. Depending on the configuration of the configuration unit 700, the reservoir pressure $P_V$ or the redundancy pressure $P_R$ is thus output into the configuration line 708.

In the variant shown in FIG. 9A, the pressure distributor plate 702 is in a left-hand position in relation to FIG. 9A, and connects the first configuration port 700.1 to the third configuration port 700.3. Thus, in this configuration, the second port 14b of the 3/2 directional valve 14 is connected via the configuration line 708, the configuration unit 700, the sixth supply pressure branch line 85 and the reservoir distribution line 50 to the reservoir input 11. In this respect, the configuration corresponds to the layout shown in FIG. 3. There is no functional difference between FIG. 9A and FIG. 3 in the outputting of the individual pressures. The redundancy branch line 706 is blanked off, because the second configuration port 700.2 is closed.

If it is now sought, on the basis of the embodiment shown in FIG. 9A, to realize the Scandinavian trailer configuration SAK (see FIG. 9B), the pressure distributor plate 702 must be moved into the right-hand position in relation to FIG. 9A. This is shown in FIG. 9B. In FIG. 9B, the pressure distributor plate 702 has been displaced such that the second configuration port 700.2 is connected to the third configuration port 700.3. This has the result that the redundancy pressure $P_R$ is output both at the first port 14a of the 3/2 directional valve 14 and at the second port 14b of the 3/2 directional valve 14, if said pressure prevails at the redundancy pressure port 42. In this embodiment (FIG. 9B), the sixth supply pressure branch line 85 is blanked off, and the reservoir input 11 is connected to the immobilizing brake unit EPH only via the reservoir distribution line 50 or that portion 50a of the reservoir distribution line 50 which leads to the immobilizing brake unit EPH, and said reservoir input is connected to the trailer control unit TCV via the third supply pressure branch line 68. Even though the pneumatically controlled 3/2 directional valve 14 in this embodiment (FIG. 9B) switches back and forth between the first and second switching positions in a manner dependent on the second control pressure P2, it is nevertheless always only the redundancy pressure $P_R$, and not the fourth control pressure P4, that is output in the second redundancy pressure line 17.

Furthermore, as a variant, an adjusting screw 703 is shown using dashed lines in FIG. 9A. The adjusting screw 703 can be used to position the pressure distributor plate 702. It may also itself have passages or channels.

In the second exemplary embodiment (FIG. 10) of the electropneumatic control module 1 with configuration unit 700, said configuration unit is formed as a switching slide valve 704. In this respect, the first configuration port 700.1 is formed by a first slide valve port 704.1, the second configuration port 700.2 is formed by a second slide valve port 704.2, and the third configuration port 700.3 is formed by a third slide valve port 704.3. The switching slide valve 704 has a switch 709 by means of which the switching slide valve 704 can be switched back and forth between a first switching position, which is not shown in FIG. 10, and a second switching position, which is shown in FIG. 10. The switch 709 may be formed as a handle (push-pull switch).

In the first switching position, which is not shown in FIG. 10, the first slide valve port 704.1 is connected to the third slide valve port 704.3, such that the reservoir pressure $P_V$ is output at the second port 14b of the 3/2 directional valve 14. In the second switching position, which is shown in FIG. 10, of the switching slide valve 704, the second slide valve port 704.2 is connected to the third switching slide valve port 704.3, such that the redundancy pressure $P_R$ is output at the second port 14b of the 3/2 directional valve 14. The first switching position, which is not shown in FIG. 10, thus replicates the European trailer configuration EAK, and the second switching position, which is shown in FIG. 10, of the switching slide valve 704 replicates the Scandinavian trailer configuration SAK.

In this embodiment (FIG. 10), it is advantageous that an operator of the vehicle combination can themselves move the switching slide valve 704 into the various switching positions and, in this way, an electropneumatic control module 1 is created which can satisfy both the European standard and the Scandinavian standard.

Through corresponding checking, by means of the brake pressure sensor 76, of the pressure output at the trailer brake pressure port 22, as described above, it is also possible for the switching position of the switching slide valve 704 to be checked for plausibility.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE DESIGNATIONS

A Axis
EAK European trailer configuration
ECU Electronic control unit
EPH Immobilizing brake unit
IV Inlet valve
OV Outlet valve
$P_0$ Ambient pressure
$P_1$ First control pressure
$P_2$ Second control pressure
$P_3$ Third control pressure
$P_4$ Fourth control pressure
$P_B$ Brake pressure
$P_{BA}$ Brake pressure (prior art)
$P_{BV}$ Front-axle brake pressure
$P_{BST}$ Brake transducer control pressure
$P_F$ Spring-type actuator working pressure
$P_R$ Redundancy pressure
$P_V$ Reservoir pressure
RV Redundancy valve
$S_1$ First signal (immobilizing brake signal)
$S_2$ Second signal
$S_3$ Third signal $S_4$ Fourth signal
$S_{DA}$ Pressure signal from sensor 76
$S_{H1}$ First auxiliary brake signal
$S_{H2}$ Second auxiliary brake signal
$S_R$ Redundant electronic brake signal
$S_{PR}$ Redundancy pressure signal from sensor 90
SAK Scandinavian trailer configuration
TCV Trailer control unit
1 Electropneumatic control module
2 Housing
3 Pressure sink
4 Spring-type actuator port
6 Spring-type actuator
6a Cylinder of the spring-type actuator
8 Immobilizing brake valve unit
10 Bistable valve
10a First bistable valve port
10b Second bistable valve port
10c Third bistable valve port
11 Reservoir input
12 Parking brake valve unit
13 Pneumatically controlled switching valve
14 Pneumatically controlled 3/2 directional valve
14a First port of the 3/2 directional valve
14b Second port of the 3/2 directional valve
14c Third port of the 3/2 directional valve
15 Pneumatic control input of the 3/2 directional valve
16 First redundancy pressure line
17 Second redundancy pressure line
18 Shuttle valve
18a First input of the shuttle valve
18b Second input of the shuttle valve
18c Outlet of the shuttle valve
19 Double-acting check valve
20 Second relay valve
21 Trailer supply pressure port
22 Trailer brake pressure port
23 Input of the second relay valve
24 Output of the second relay valve
25 Control input of the second relay valve
26 Ventilation output of the second relay valve
42 Redundancy pressure port
50 Reservoir distribution line
50a Portion of the reservoir distribution line to EPH
51 Ventilation distribution line
52 First reservoir branch line
53 First ventilation branch line
54 First control line
55 Auxiliary brake valve
56a First auxiliary brake valve port
56b Second auxiliary brake valve port
57 Second control line
58 First relay valve
59a Control input of the first relay valve
59b Reservoir port of the first relay valve
59c Output of the first relay valve
60 Second reservoir branch line
62 Spring-type actuator line
63 First pressure measurement line
64 Pressure sensor
65 Trailer control valve unit
66 Inlet-outlet valve unit
67a First inlet valve port
67b Second inlet valve port
68 Third reservoir pressure branch line
69 Third control line
70 Second ventilation branch line
71 Fourth reservoir pressure branch line
72a First port of the trailer breakaway valve
72b Second port of the trailer breakaway valve
73 Trailer breakaway valve
74 Fifth reservoir pressure branch line
75 Trailer brake pressure line
76 Brake pressure sensor
77 Brake pressure measurement line
78a First outlet valve port
78b Second outlet valve port
79 Third ventilation branch line
80a First redundancy valve port
80b Second redundancy valve port
81 Redundancy pressure control line
83 Pneumatic control line
84 Fourth ventilation branch line
85 Sixth supply pressure branch line
90 Redundant pressure sensor
91 Redundancy pressure measurement line
100 Control chamber
102 Control piston
104 Valve seat
106 Slide ring
108 Spiral spring
110 Second valve seat
112 Projection
114 Working space
130 Noise damper
500 Vehicle combination
502 Tractor vehicle
504 Trailer vehicle
503 Front axle
506 Axle of the trailer vehicle
507a, 507b, 507c, 507d Wheels
508 Trailer service brake system
510a, 510b Two service brakes of the trailer vehicle
511, 512 Ports
513, 514 Pneumatic lines
515, 516 Ports
520 Electronically controllable pneumatic brake system
521 First reservoir
522 Rear-axle brake circuit
523 Second reservoir
524 Front-axle brake circuit
525 Third compressed-air reservoir
526 Pneumatic reservoir feed line
528 Brake transducer
529 Front-axle modulator
530a, 530b Two front service brakes
531 Rear-axle modulator
532a, 532b Two (Tristop) service brakes
533 Trailer brake circuit
534 Manual brake switch (HCU)
535a, 535b ABS modules
536 Control unit for autonomous driving
537 Energy source
538 SAE unit (BUS system)
539 Steer angle sensors
540a, 540b, 540c, 540d Sensors for brake pad wear sensing
541a, 541b, 541c, 541d Sensors for a rotational speed of the wheels
550 Signal line
552 Redundancy pressure feed line
554 First CAN bus (direct)
556 Second CAN bus (indirect)
557 Voltage supply 558 Voltage supply, HCU
560a, 560b Pneumatic lines
561 First bus connection
562 Second bus connection
590 Electronic brake pedal
591 Port
600 Foot-operated pedal
602 Electric travel transducer
604 Electrical line
605 Pneumatic output
606 Pneumatic line
607 Separate housing
608 Electronic control unit
609 Immobilizing brake valve unit
610 Reservoir input
611 Reservoir line
612 Electrical connection
613 Signal line
614 Bistable valve
615a First port of the bistable valve
615b Second port of the bistable valve
615c Third port of the bistable valve
616 2/2 directional valve
617a First port of the 2/2 directional valve
617b Second port of the 2/2 directional valve
618 3/2 directional valve
619a First port of the 3/2 directional valve
619b Second port of the 3/2 directional valve
619c Third port of the 3/2 directional valve
620 Pneumatic line
621 Pneumatic line
622 Pneumatic line
636 Relay valve, EPH
637a Control input of the second relay valve
637b Reservoir port of the second relay valve
637c Working output of the second relay valve
638 Pneumatic line
640 Spring-type actuator line
641 Spring-type actuator port
642 Spring-type actuator
642a Cylinder of the spring-type actuator
650 Housing, TCV
651 Inlet-outlet valve unit
652 Inverse relay valve
654 Trailer breakaway valve
655 Port
657 Electronic connection
658 Signal line
660 Inlet valve
661a First port of the inlet valve
661b Second port of the inlet valve
662 Outlet valve
664 Redundancy valve
665a First port of the redundancy valve
670 First control chamber of the inverse relay valve
671 Trailer brake pressure port
672 Trailer supply pressure port
674 Parking brake pressure line
675 Port
676 Port
677 Pneumatic line
678 Pneumatic reservoir line
679 Branch line
680 Second control chamber
681 Inverse relay piston
682 Third control chamber
683 Relay piston
690 Front-axle shuttle valve
692 T-piece
693 Front-axle brake pressure line
694 Second redundancy pressure feed line
695 Control line
696 Front-axle control line port
700 Configuration unit
700.1 First configuration port
700.2 Second configuration port
700.3 Third configuration port
702 Pressure distributor plate
703 Adjusting screw
704 Switching slide valve
704.1 First slide valve port
704.2 Second slide valve port
704.3 Third slide valve port
706 Redundancy branch line
708 Configuration line
709 Switch

The invention claimed is:

1. An electropneumatic control module for an electronically controllable pneumatic brake system for a vehicle combination with a tractor vehicle and a trailer vehicle, the electropneumatic control module comprising:
a pneumatic reservoir input, which is connectable to a compressed-air reservoir,
a trailer control unit, which has a trailer control valve unit with one or more electropneumatic valves, a trailer brake pressure port and a trailer supply pressure port,
an immobilizing brake unit, which has a spring actuator port for at least one spring actuator for a tractor vehicle and an immobilizing brake valve unit with one or more electropneumatic valves,
an electronic control unit, wherein the electronic control unit is designed to, based on an electronic immobilizing signal, trigger the immobilizing brake valve unit to switch at least one of the one or more electropneumatic valves of the immobilizing brake valve unit such that the spring actuator port is connected to a pressure sink for the purposes of ventilating the spring actuator,
a parking brake valve unit, having a pneumatically controlled switching valve which has a pneumatic control input for receiving a pneumatic control pressure, wherein, when the spring actuator port is connected to the pressure sink, the pneumatically controlled switching valve is switched such that a brake pressure can be output at the trailer brake pressure port, and
a redundancy pressure port with a first redundancy pressure line for connection of a brake transducer or of a brake pressure or a control pressure of one axle of the vehicle combination, via which redundancy pressure port the brake pressure can be output at the trailer brake pressure port.

2. The electropneumatic control module as claimed in claim 1, wherein the pneumatic control pressure is the pressure at the spring actuator port.

3. The electropneumatic control module as claimed in claim 1, wherein the pneumatic control pressure is an immobilizing brake control pressure in an upstream pilot-control unit of the immobilizing brake unit.

4. The electropneumatic control module as claimed in claim 1, wherein a brake pressure of a service brake can be output at the redundancy pressure port.

5. The electropneumatic control module as claimed in claim 1, wherein the pneumatically controlled switching valve is connected by means of a third port to a second redundancy pressure line, to which the first redundancy pressure line is also connectable such that, when the pneumatically controlled switching valve is switched, a pressure can be output into the second redundancy pressure line.

6. The electropneumatic control module as claimed in claim 5, wherein the pneumatically controlled switching valve is formed as a 3/2 directional valve with a first port, a second port, and the third port.

7. The electropneumatic control module as claimed in claim 6, wherein the first port of the pneumatically controlled 3/2 directional valve is connected to the redundancy pressure port and the second port of the pneumatically controlled 3/2 directional valve is connected to the reservoir input.

8. The electropneumatic control module as claimed in claim 6, wherein the first port of the pneumatically controlled 3/2 directional valve is connected to the pressure sink.

9. The electropneumatic control module as claimed in claim 6, wherein the third port of the pneumatically controlled 3/2 directional valve is connected to a first input of a shuttle valve, a second input of the shuttle valve is connected to the redundancy pressure port, and an output of the shuttle valve is connected to the second redundancy pressure line.

10. The electropneumatic control module as claimed in claim 9, wherein the shuttle valve is formed as a check valve with two inputs.

11. The electropneumatic control module as claimed in claim 1, wherein, between a third port of the pneumatically controlled switching valve and the trailer brake pressure port, there is arranged an electronic switching valve in the form of a 3/2 directional valve or a 2/2 directional valve, which is open in an electrically deenergized position, such that, even when the spring actuator port is connected to the pressure sink, an outputting of a brake pressure at the trailer brake pressure port can be prevented.

12. The electropneumatic control module as claimed in claim 1, wherein the trailer control unit has a relay valve, which has:
 an input connected to the reservoir input,
 an output connected to the trailer brake pressure port,
 a ventilation output, via which the output is connectable to a pressure sink, and
 a control input, which opens into a common control chamber,
 wherein the control input is connectable via the trailer control valve unit to the reservoir input and/or to the pressure sink in order to output a brake pressure at the trailer brake pressure port.

13. The electropneumatic control module as claimed in claim 12, wherein the control chamber of the relay valve is delimited by a single control piston.

14. The electropneumatic control module as claimed in claim 12, wherein the control chamber is connectable to the reservoir input by means of an electronically switchable inlet valve.

15. The electropneumatic control module as claimed in claim 1, wherein the trailer control unit comprises a relay valve having a control input, which opens into a common control chamber, and wherein the control chamber is connectable to the first redundancy pressure line.

16. The electropneumatic control module as claimed in claim 1, wherein the electronic control unit is designed to,
 based on a first electronic auxiliary brake signal, trigger the immobilizing brake valve unit to switch at least one of the one or more electropneumatic valves of the immobilizing brake valve unit such that a working pressure for the temporary and stepped ventilation of the spring actuator is output at the spring actuator port; and
 based on the first electronic auxiliary brake signal or a second auxiliary brake signal, trigger the trailer control valve unit to switch at least one of the one or more electropneumatic valves of the trailer control valve unit such that a brake pressure is output at the trailer brake pressure port.

17. The electropneumatic control module as claimed in claim 1, wherein the electronic control unit, the trailer control unit and the immobilizing brake unit are integrated in one module.

18. The electropneumatic control module as claimed in claim 1, having a common housing in which at least the components of the electronic control unit, of the trailer control unit and of the immobilizing brake unit are arranged.

19. The electropneumatic control module as claimed in claim 1, wherein no inverse relay valve is provided.

20. The electropneumatic control module as claimed in claim 1, having a redundant pressure sensor which is arranged on the first redundancy pressure line or at the redundancy pressure port and which is designed to detect a pneumatic redundancy pressure at the redundancy pressure port and to provide a corresponding redundancy pressure signal as a redundant electronic service brake signal to the control unit, wherein the control unit is designed to, in a manner dependent on the received redundant electronic service brake signal, switch at least one valve of the trailer control valve unit such that a corresponding brake pressure is output at the trailer brake pressure port.

21. The electropneumatic control module as claimed in claim 7, having a configuration unit by means of which the electropneumatic control module can be configured between a European trailer configuration and a Scandinavian trailer configuration.

22. The electropneumatic control module as claimed in claim 21, wherein the configuration unit has a pressure distributor plate, a switching slide valve or an adjusting screw.

23. The electropneumatic control module as claimed in claim 21, wherein the configuration unit has a first configuration port, which is connected to the reservoir input, a second configuration port, which is connected to the redundancy pressure port, and a third configuration port, which is connected to the second port of the pneumatically controlled 3/2 directional valve.

24. The electropneumatic control module as claimed in claim 23, wherein, in the European trailer configuration, the first configuration port is connected to the third configuration port; and, wherein in the Scandinavian trailer configuration, the second configuration port is connected to the third configuration port.

25. A tractor vehicle having an electropneumatic control module as claimed in claim 1.

* * * * *